United States Patent
Sreedhar et al.

(10) Patent No.: US 11,757,888 B2
(45) Date of Patent: Sep. 12, 2023

(54) SYSTEMS AND METHODS FOR FINE GRAINED FORWARD TESTING FOR A ZTNA ENVIRONMENT

(71) Applicant: Fortinet, Inc., Sunnyvale, CA (US)

(72) Inventors: Rajiv Sreedhar, Sunnyvale (CA); Manuel Nedbal, Santa Clara, CA (US); Manoj Ahluwalia, San Jose, CA (US); Damodar K. Hegde, Santa Clara, CA (US); Jitendra B. Gaitonde, Cupertino, CA (US); Suresh Rajanna, San Jose, CA (US); Mark Lubeck, San Jose, CA (US); Gary Nool, Princeton, NJ (US)

(73) Assignee: Fortinet, Inc., Sunnyvale, CA (US)

(*) Notice: Subject to any disclaimer, the term of this patent is extended or adjusted under 35 U.S.C. 154(b) by 158 days.

(21) Appl. No.: 17/348,152

(22) Filed: Jun. 15, 2021

(65) Prior Publication Data
US 2022/0400114 A1 Dec. 15, 2022

(51) Int. Cl.
H04L 29/06 (2006.01)
H04L 9/40 (2022.01)
H04L 43/50 (2022.01)

(52) U.S. Cl.
CPC .......... H04L 63/101 (2013.01); H04L 43/50 (2013.01); H04L 63/0263 (2013.01); H04L 63/20 (2013.01)

(58) Field of Classification Search
CPC ... H04L 63/101; H04L 63/20; H04L 63/0263; H04L 63/1466; H04L 63/107; H04L 63/105
USPC .................................................... 726/1
See application file for complete search history.

(56) References Cited

U.S. PATENT DOCUMENTS

| | | |
|---|---|---|
| 7,546,629 B2 * | 6/2009 | Albert ............... H04L 12/2876 726/13 |
| 8,813,236 B1 | 8/2014 | Saha |
| 9,027,077 B1 | 5/2015 | Bharali |
| 9,444,829 B1 | 9/2016 | Ashley |
| 10,579,407 B2 | 3/2020 | Ahuja et al. |
| 10,944,723 B2 | 3/2021 | Ahuja et al. |
| 11,120,148 B2 | 9/2021 | Sreedhar et al. |
| 2007/0136788 A1 | 6/2007 | Monahan |
| 2010/0005505 A1 | 1/2010 | Gottimukkala |
| 2011/0138441 A1 | 6/2011 | Neystadt |
| 2014/0156814 A1 | 6/2014 | Barabash |
| 2014/0214914 A1 | 7/2014 | Alex |
| 2014/0280152 A1 | 9/2014 | Jun |
| 2014/0280946 A1 | 9/2014 | Mukherjee |
| 2015/0256413 A1 | 9/2015 | Du |
| 2016/0034269 A1 | 2/2016 | Furuichi |
| 2016/0062754 A1 | 3/2016 | Tripp |
| 2016/0112270 A1 | 4/2016 | Danait |
| 2016/0344772 A1 | 11/2016 | Monahan |
| 2016/0359680 A1 | 12/2016 | Parandehgheibi |
| 2016/0359740 A1 | 12/2016 | Parandehgheibi |
| 2016/0359915 A1 | 12/2016 | Gupta |
| 2017/0126834 A1 | 5/2017 | Fransen |
| 2017/0207980 A1 | 7/2017 | Hudis |
| 2017/0237778 A1 | 8/2017 | DiGiambattista |

(Continued)

Primary Examiner — Longbit Chai
(74) Attorney, Agent, or Firm — HDC Intellectual Property Law, LLP

(57) ABSTRACT

Systems, devices, and methods are discussed for forward testing rule sets at a granularity that is less than all activity on the network. In some cases, the granularity is that of an individual application.

20 Claims, 15 Drawing Sheets

(56) References Cited

U.S. PATENT DOCUMENTS

| | | |
|---|---|---|
| 2017/0272442 A1 | 9/2017 | Klimovs et al. |
| 2017/0324765 A1 | 11/2017 | McLaughlin |
| 2017/0339178 A1 | 11/2017 | Mahaffey |
| 2018/0027006 A1 | 1/2018 | Zimmermann |
| 2018/0069899 A1 | 3/2018 | Lang |
| 2018/0103052 A1 | 4/2018 | Chondhury |
| 2018/0247188 A1 | 8/2018 | Wong |
| 2018/0278496 A1 | 9/2018 | Kulshreshtha |
| 2018/0287907 A1 | 10/2018 | Kulshreshtha |
| 2018/0373462 A1 | 12/2018 | Childress |
| 2019/0036950 A1 | 1/2019 | Isola |
| 2020/0296134 A1 | 9/2020 | Sreedhar et al. |
| 2021/0126948 A1 | 4/2021 | Nedbal et al. |

\* cited by examiner

| ACL Rule | Traffic Source | Traffic Destination | Protocol | Port | Action |
|---|---|---|---|---|---|
| Rule 1 | Any | Web | TCP | 80 | Allow |
| Rule 2 | Web | Application A | TCP | 443 | Allow |
| Rule 3 | Application A | Database | TCP | 3016 | Allow |
| Rule 4 | Any | Any | Any | Any | Block |

450

| ACL Rule | Traffic Source | Traffic Destination | Protocol | Port | Action |
|---|---|---|---|---|---|
| Rule 1 | Any | Web A | TCP | 80 | Allow |
| Rule 2 | Web | Application A | TCP | 443 | Allow |
| Rule 3 | Application A | Database A | TCP | 3016 | Allow |
| Rule 4 | Any | Web B | TCP | 80 | Allow |
| Rule 5 | Web B | Application B | TCP | 443 | Allow |
| Rule 6 | Application B | Database B | TCP | 3016 | Allow |
| Rule 7 | SECURED GROUP | Any | Any | Any | Block |
| Rule 8 | Any | SECURED GROUP | Any | Any | Block |
| Rule 9 | Any | Any | Any | Any | Block |

810

| Identified Workloads Touching Database C or Application A ||||
|---|---|---|---|
| Traffic Source | Traffic Destination | Protocol | Port |
| Application A | Web | TCP | 80 |
| Web | Database C | TCP | 443 |
| Endpoint X | Database C | TCP | 3020 |
| Endpoint Y | Application A | TCP | 80 |

| ACL Rule | Traffic Source | Traffic Destination | Protocol | Port | Action |
|---|---|---|---|---|---|
| Rule 1 | Application A | Web | TCP | 80 | Allow |
| Rule 2 | Web | Database C | TCP | 443 | Allow |
| Rule 3 | Endpoint X | Database C | TCP | 3020 | Allow |
| Rule 4 | Endpoint Y | Application A | TCP | 80 | Allow |
| Rule 5 | Any | Any | Any | Any | Allow |

| ACL Rule | Traffic Source | Traffic Destination | Protocol | Port | Action |
|---|---|---|---|---|---|
| Rule 1 | Application A | Web | TCP | 80 | Allow |
| Rule 2 | Web | Database C | TCP | 443 | Allow |
| Rule 3 | Endpoint X | Database C | TCP | 3020 | Allow |
| Rule 4 | Endpoint Y | Application A | TCP | 80 | Allow |
| Rule 5 | Any | Any | Any | Any | Block |

FIG. 8C

SYSTEMS AND METHODS FOR FINE GRAINED FORWARD TESTING FOR A ZTNA ENVIRONMENT

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2021, Fortinet, Inc.

FIELD

Embodiments discussed generally relate to securing network environments, and more particularly to systems and methods for forward testing rule sets at a granularity that is less than an entire network. In some cases, the granularity is that of an individual application.

BACKGROUND

It is not uncommon for network environments to support hundreds of applications that all need to be secured. In some approaches, an operator is tasked with identifying allowed workloads, and manually modifying one or more firewalls with rules that allow identified workloads and disallow unidentified workloads. Then, the operator must forward test the implemented rules. This can become time consuming and is often subject to error due to the complexity of workloads and the impact of security measures on other applications in the network environment.

Thus, there exists a need in the art for more advanced approaches, devices and systems for developing and implementing security measures in a network environment.

SUMMARY

Various embodiments provide systems and methods for forward testing rule sets at a granularity that is less than all activity on the network. In some cases, the granularity is that of an individual application.

This summary provides only a general outline of some embodiments. Many other objects, features, advantages and other embodiments will become more fully apparent from the following detailed description, the appended claims and the accompanying drawings and figures.

BRIEF DESCRIPTION OF THE DRAWINGS

A further understanding of the various embodiments may be realized by reference to the figures which are described in remaining portions of the specification. In the figures, similar reference numerals are used throughout several drawings to refer to similar components. In some instances, a sub-label consisting of a lower-case letter is associated with a reference numeral to denote one of multiple similar components. When reference is made to a reference numeral without specification to an existing sub-label, it is intended to refer to all such multiple similar components.

FIGS. 8A-8C show example workloads and corresponding access control lists that may be identified and formed in accordance with various embodiments.

DETAILED DESCRIPTION

Figure 1A:
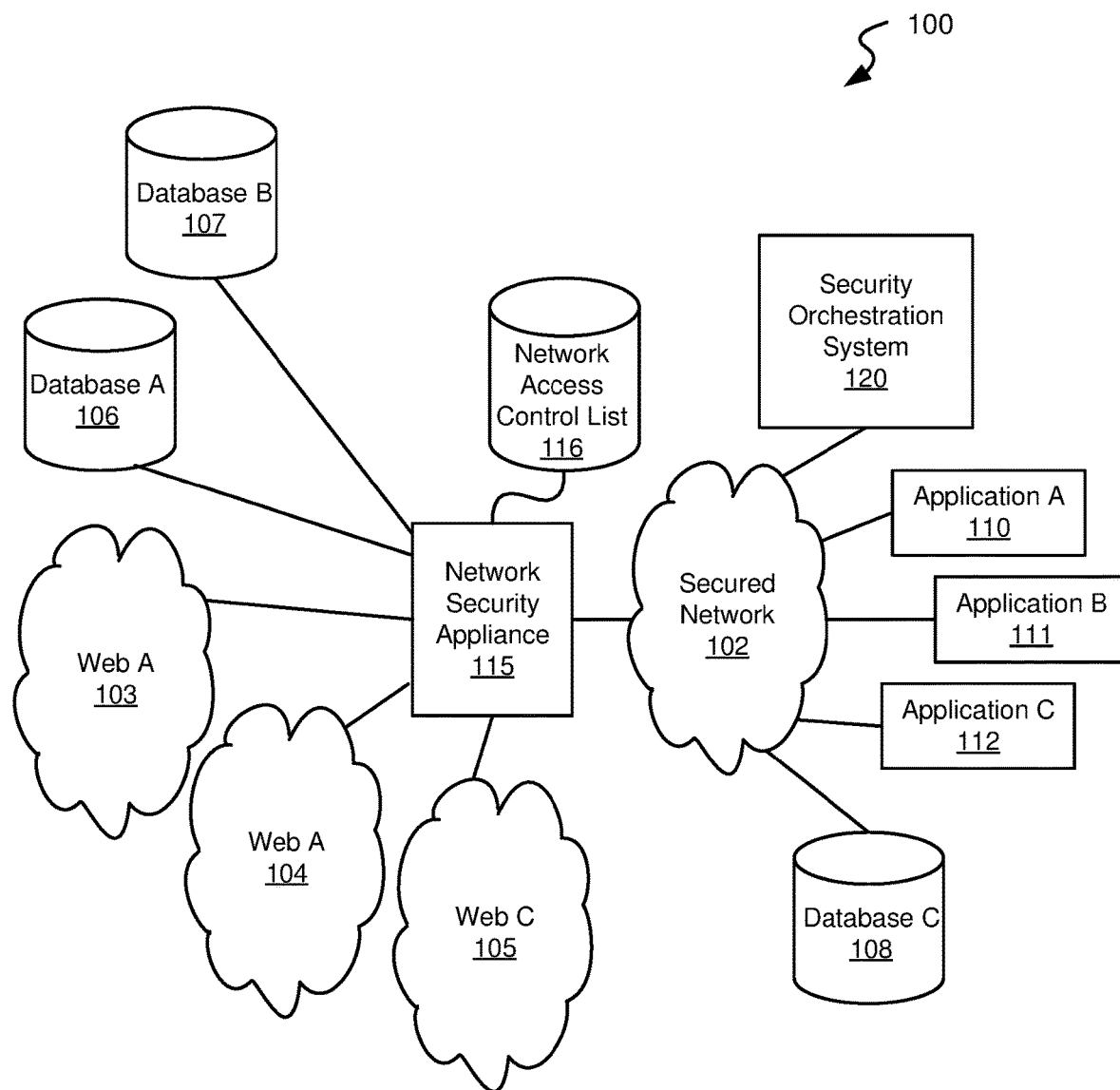
FIGS. 1A-1D illustrate a network architecture including a security orchestration system in accordance with some embodiments.

Various embodiments provide systems and methods for forward testing rule sets at a granularity that is less than all activity on the network. In some cases, the granularity is that of an individual application.

An example enterprise network may have hundreds of applications, and each of the hundreds of applications may consist of several interconnected tiers having workloads communicating between each other. Such workloads utilize common network infrastructure including, but not limited to, domain name system (DNS), dynamic host configuration protocol (DHCP), network time protocol (NTP), the internet, and/or management software (e.g., performance and/or health monitoring software. At the same time groups of clients (e.g., administrators, developers, testers, or the like) may desire access to the aforementioned workloads to perform their various tasks. In addition, network scanners and other administrative tools add complexity by connecting to each asset over a range of ports. In such an environment, determining a desired zero trust network access (ZTNA) is challenging, and as workloads and clients continue become more dynamic, the complexity of determining desired security parameters and implementing those security parameters in one or more network appliances becomes progressively more complex. As just one example, in the past the processes related to determining and setting firewall rules could be done manually, however, to the extent such rules are still being set and maintained manually, it is only time before complexity renders such an approach impossible.

To address some of this complexity, approaches for automatically determining and setting security parameters using some level of machine learning and automation have been developed. U.S. Pat. No. 10,944,723 entitled "Systems and Methods for Managing Endpoints and Security Policies in a Networked Environment", and issued Mar. 9, 2021 describes a variety of approaches for reducing the complexity of maintaining network security at a network environment level. The entirety of the aforementioned reference is incorporated herein by reference for all purposes. Such an approach greatly enhances the ease at which a network environment may be monitored and secured.

One problem with forward testing in current network environments is that the testing is applied to the network, and it is difficult if not impossible to perform testing on smaller scale elements of the network. For example, when testing an access control list (ACL) that controls what endpoints can speak to which network services and vice-versa, forward testing is applied to the ACL for the entire network and thereby validates the ACL all at once. Assume at time t in state s1 it was determined that x applications and y workloads exist in a network environment and the ruleset [R] was found to be steady and not changing. Of note, in a dynamic environment the assumption that the ruleset is steady is valid only between two changes. Further assume, forward testing has been running for a sufficient time, and the operator decides to change to an enforcement state. Such a change in state results in a change of a default ACL rule from allow to block. At this juncture, the network environment enforces the generated ZTNA policy as only trusted and identified workloads are allowed.

Now assume that at time t+1 it is found that a change to s1 (which is altering x, y or {R}) leads to s2 and it becomes desirable to re-apply forward testing to the ACL, the forward testing would be reapplied as before to the entire ACL. This would involve changing the default ACL rule from block to allow while the ACL rules are being tested. This change removes the ZTNA enforcement from all applications in the same ACL. This change is only temporary, but while the forward testing is being performed the ZTNA. Further, this re-application must be repeated for every determined change in s. In addition, the results of the testing may be difficult to utilize and manage as they consider all applications in the same ACL.

It has been found that by modifying the granularity at which a network environment can be secured, the impact upon administrators overseeing a process of securing a network can be minimized, and/or the downtime of ZTNA can be reduced. Various embodiments discussed herein provide for increased granularity of forward testing in a network environment.

Embodiments of the present disclosure include various processes, which will be described below. The processes may be performed by hardware components or may be embodied in machine-executable instructions, which may be used to cause a general-purpose or special-purpose processor programmed with the instructions to perform the steps. Alternatively, processes may be performed by a combination of hardware, software, firmware and/or by human operators.

Embodiments of the present disclosure may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within a single computer) and storage systems containing or having network access to computer program(s) coded in accordance with various methods described herein, and the method steps of the disclosure could be accomplished by modules, routines, subroutines, or subparts of a computer program product.

In the following description, numerous specific details are set forth in order to provide a thorough understanding of embodiments of the present disclosure. It will be apparent to one skilled in the art that embodiments of the present disclosure may be practiced without some of these specific details.

Terminology

Brief definitions of terms used throughout this application are given below.

The terms "connected" or "coupled" and related terms, unless clearly stated to the contrary, are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

As used herein, a "network appliance" or a "network device" generally refers to a device or appliance in virtual or physical form that is operable to perform one or more network functions. In some cases, a network appliance may be a database, a network server, or the like. Some network devices may be implemented as general-purpose computers or servers with appropriate software operable to perform the one or more network functions. Other network devices may also include custom hardware (e.g., one or more custom Application-Specific Integrated Circuits (ASICs)). Based upon the disclosure provided herein, one of ordinary skill in the art will recognize a variety of network appliances that may be used in relation to different embodiments. In some cases, a network appliance may be a "network security appliance" or a network security device" that may reside within the particular network that it is protecting or network security may be provided as a service with the network security device residing in the cloud. For example, while there are differences among network security device vendors, network security devices may be classified in three general performance categories, including entry-level, mid-range, and high-end network security devices. Each category may use different types and forms of central processing units (CPUs), network processors (NPs), and content processors (CPs). NPs may be used to accelerate traffic by offloading network traffic from the main processor. CPs may be used for security functions, such as flow-based inspection and encryption. Entry-level network security devices may include a CPU and no co-processors or a system-on-a-chip (SoC) processor that combines a CPU, a CP and an NP. Mid-range network security devices may include a multi-core CPU, a separate NP Application-Specific Integrated Circuits (ASIC), and a separate CP ASIC. At the high-end, network security devices may have multiple NPs and/or multiple CPs. A network security device is typically associated with a particular network (e.g., a private enterprise network) on behalf of which it provides the one or more security functions. Non-limiting examples of security functions include authentication, next-generation firewall protection, antivirus scanning, content filtering, data privacy protection, web filtering, network traffic inspection (e.g., secure sockets layer (SSL) or Transport Layer Security (TLS) inspection), intrusion prevention, intrusion detection, denial of service attack (DoS) detection and mitigation, encryption (e.g., Internet Protocol Secure (IPSec), TLS, SSL), application control, Voice over Internet Protocol (VoIP) support, Virtual Private Networking (VPN), data leak prevention (DLP), antispam, antispyware, logging, reputation-based protections, event correlation, network access control, vulnerability management, and the like. Such security functions may be deployed individually as part of a point solution or in various combinations in the form of a unified threat management (UTM) solution. Non-limiting examples of network security appliances/devices include network gateways, VPN appliances/gateways, UTM appliances (e.g., the FORTIGATE family of network security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), network access control appliances (e.g., FORTINAC family of network access control appliances), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTI-WIFI family of wireless security gateways), virtual or physical sandboxing appliances (e.g., FORTISANDBOX family of security appliances), and DoS attack detection appliances (e.g., the FORTIDDOS family of DoS attack detection and mitigation appliances).

The phrase "processing resource" is used in its broadest sense to mean one or more processors capable of executing instructions. Such processors may be distributed within a network environment or may be co-located within a single network appliance. Based upon the disclosure provided herein, one of ordinary skill in the art will recognize a variety of processing resources that may be used in relation to different embodiments.

The phrase "forward testing" is used in its broadest sense to be any process whereby simulation is used in relation to establish rules to discern the utility and/or efficacy of such rules. Thus, as one example, forward processing may include utilizing a firewall that has established one or more network processing rules to determine whether rules in an ACL are properly operating. Such forward processing may use simulated data or actual network data depending upon the particular implementation. In such a case, the forward processing is used, for example, to test a variety of what-if scenarios, to determine what network traffic gets blocked, to determine what network traffic is allowed, and/or to determine if one of a variety of applications available in the network environment operates properly when the rules are applied.

Example embodiments will now be described more fully hereinafter with reference to the accompanying drawings, in which exemplary embodiments are shown. This disclosure may, however, be embodied in many different forms and should not be construed as limited to the embodiments set forth herein. It will be appreciated by those of ordinary skill in the art that the diagrams, schematics, illustrations, and the like represent conceptual views or processes illustrating systems and methods embodying various aspects of the present disclosure. The functions of the various elements shown in the figures may be provided through the use of dedicated hardware as well as hardware capable of executing associated software and their functions may be carried out through the operation of program logic, through dedicated logic, through the interaction of program control and dedicated logic.

Some embodiments provide methods for performing forward testing on an access control list in a network environment. Such methods include: accessing, by a processing resource, a first access control list including at least a first workload rule that allows a first type of network communication and a default rule, where the first type of network communication corresponds to a first application; modifying, by the processing resource, the first access control list to yield a second access control list, where the second access control list additionally includes at least a secure rule and a second workload rule, where the secure rule blocks at least the first type of network communication, where the second workload rule allows a second type of network communication, and where the second type of network communication corresponds to the second application; and forward testing, by the processing resource, the second access control list, where the forward testing includes applying a set of network control rules included in the second access control list in a sequence until one of the rules in the set of network control rules is satisfied, and wherein the sequence includes: applying the first workload rule before the secure rule; applying the secure rule before applying the second workload rule; applying the second workload rule before applying the default rule; and applying the default rule. In some instances of the aforementioned embodiments, the methods further include modifying, by the processing resource, the default rule to block any network communication between any source and any destination.

In some instances of the aforementioned embodiments, the default rule allows any network communication between any source and any destination. In some such instances, the method further include: logging, by the processing resource, any network communications allowed by applying the default rule to yield logged network communications; and reporting, by the processing resource, the logged network communications. In some cases where the set of network control rules is a first set of network control rules, and the sequence is a first sequence, the methods further include forward testing, by the processing resource, a third access control list. The third access control list is the second access control list modified to include a third workload rule implemented to address an issue reflected in the logged network communications. Forward testing the third access control list includes applying a second set of network control rules included in the third access control list in a second sequence until one of the rules in the second set of network control rules is satisfied. The second sequence includes: applying the first workload rule before the secure rule; applying the secure rule before applying the second workload rule or the third workload rule; applying the second workload rule and the third default rule before applying the default rule; and applying the default rule. In various instances of the aforementioned embodiments, the logged network communications are not related to the first application.

In one or more instances of the aforementioned embodiments where the set of network control rules is a first set of network control rules and the sequence is a first sequence, the methods further include: modifying, by the processing resource, the secure rule to yield a modified secure rule, where the modified secure rule blocks at least the second type of network communication in addition to the first type of network communication; modifying, by the processing resource, the second access control list to yield a third access control list. The third access control list includes the modified secure rule and a third workload rule that allows a third type of network communication corresponding to a third application. The methods further include forward testing, by the processing resource, the third access control list, where the forward testing includes applying a second set network control rules included in the third access control list in a second sequence until one of the rules in the second set of network control rules is satisfied. The second sequence includes: applying the first workload rule and the second workload rule before the secure rule; applying the secure rule before applying the third workload rule; applying the third workload rule before applying the default rule; and applying the default rule. In some such instance, the default rule allows any network communication between any source and any destination, and the methods further include: logging, by the processing resource, any network communications allowed by applying the default rule to yield logged network communications; and reporting, by the processing resource, the logged network communications. The logged network communications are not related to either the first application or the second application.

In some cases of the aforementioned embodiments, the processing resource is included in a network appliance. In various such cases, the network appliance is a network firewall.

Other embodiments provide network appliances that include a processing resource and a non-transitory computer readable medium coupled to the processing resource. The non-transitory computer-readable medium has stored therein instructions that when executed by the processing resource cause the processing resource to: access a first access control list including at least a first workload rule that allows a first type of network communication and a default rule, where the first type of network communication corresponds to a first application; modify the first access control list to yield a second access control list, where the second access control list additionally includes at least a secure rule and a second workload rule, where the secure rule blocks at least the first type of network communication, where the second workload rule allows a second type of network communication, and where the second type of network communication corresponds to the second application; and forward test the second access control list, where the forward testing includes applying a set of network control rules included in the second access control list in a sequence until one of the rules in the set of network control rules is satisfied. The sequence includes: applying the first workload rule before the secure rule; applying the secure rule before applying the second workload rule; applying the second workload rule before applying the default rule; and applying the default rule. In some instances of the aforementioned embodiments, the network appliance is a network firewall.

Yet other embodiments provide non-transitory computer-readable storage media embodying a set of instructions, which when executed by a processing resource, causes the processing resource to: access a first access control list including at least a first workload rule that allows a first type of network communication and a default rule, where the first type of network communication corresponds to a first application; modify the first access control list to yield a second access control list, where the second access control list additionally includes at least a secure rule and a second workload rule, where the secure rule blocks at least the first type of network communication, where the second workload rule allows a second type of network communication, and where the second type of network communication corresponds to the second application; and forward test the second access control list, where the forward testing includes applying a set of network control rules included in the second access control list in a sequence until one of the rules in the set of network control rules is satisfied. The sequence includes: applying the first workload rule before the secure rule; applying the secure rule before applying the second workload rule; applying the second workload rule before applying the default rule; and applying the default rule.

Yet other embodiments provide methods for focused development of a zero trust network access policy. Such methods include: accessing a focus list, wherein the focus list identifies at least one network element; monitoring network activity to yield a set of network traffic; identifying a set of workloads in the set of network traffic that are either sourced from any of the at least one network focus, or destined to any of the at least one network element; and augmenting an access control list to include one or more workload rules allowing the set of workloads. The network element may be, but is not limited to, a network endpoint, a network appliance, an application, and/or a port of a network appliance.

In some instances of the aforementioned embodiments where the set of network traffic is a first set of network traffic and the set of workloads is a first set of workloads, the methods further include: monitoring network activity to yield a second set of network traffic; identifying a second set of workloads in the second set of network traffic that are either sourced from any of the at least one network focus, or destined to any of the at least one network focus; identifying at least one workload in the second set of workloads that is not in the first set of workloads; and augmenting the access control list to include the at least one workload in the second set of workloads that is not in the first set of workloads.

In various instances of the aforementioned embodiments where network element is a first network element, the methods further include: identifying a second network element that is either the source of a workload in the set of workloads or a destination of a workload in the set of workloads; and augmenting the focus list to include the second network element. In some such instances where the set of network traffic is a first set of network traffic and the set of workloads is a first set of workloads, the methods further include: monitoring network activity to yield a second set of network traffic; identifying a second set of workloads in the second set of network traffic that are either sourced from any of the at least one network focus, or destined to any of the at least one network element; identifying at least one workload in the second set of workloads that is not in the first set of workloads; and augmenting the access control list to include the at least one workload in the second set of workloads that is not in the first set of workloads.

In one or more instances of the aforementioned embodiments, the methods further include identifying a first application associated with two or more workloads in the set of workloads, and a second application associated with two or more other workloads in the set of workloads. In such instances, augmenting the access control list to include one or more workload rules allowing the set of workloads is an incremental modification, and wherein the incremental modification includes: augmenting the access control list to include first workload rules corresponding to the two or more workloads associated with the first application to yield a first augmented access control list; forward testing the first augmented access control list; subsequent to forward testing the first augmented access control list, augmenting the first access control list to include second workload rules corresponding to the two or more workloads associated with the second application to yield a second augmented access control list; and forward testing the second augmented access control list. In some such instances where the access control list includes a default rule that allows any network traffic between any source and any destination, the forward testing the first augmented access control list includes: applying the first workload rules; and applying the default rule after the first workload rules. In some such instances where the access control list includes a default rule that allows any network traffic between any source and any destination, the forward testing the second augmented access control list includes: applying the first workload rules; applying the second workload rules; and applying the default rule after applying all of the first workload rules and the second workload rules.

In some instances of the aforementioned embodiments the access control list includes a default rule that allows any network traffic between any source and any destination. In some such instances, the methods further include modifying the default rule to block any network traffic between any source and any destination.

Yet other embodiments provide network appliances that include: a processing resource, and a non-transitory computer-readable medium coupled to the processing resource. The non-transitory computer readable medium has stored therein instructions that when executed by the processing resource cause the processing resource to: access a focus list, wherein the focus list identifies at least one network element; monitor network activity to yield a set of network traffic; identify a set of workloads in the set of network traffic that are either sourced from any of the at least one network focus, or destined to any of the at least one network element; and augment an access control list to include one or more workload rules allowing the set of workloads.

Yet further embodiments provide non-transitory computer readable media embodying a set of instructions, which when executed by a processing resource, causes the processing resource to: access a focus list, wherein the focus list identifies at least one network element; monitor network activity to yield a set of network traffic; identify a set of workloads in the set of network traffic that are either sourced from any of the at least one network focus, or destined to any of the at least one network element; and augment an access control list to include one or more workload rules allowing the set of workloads.

Yet additional embodiments provide methods for resilient access control list development. Such methods include: identifying a first set of workloads in a set of network traffic that share at least a first trait, and a second set of workloads in the set of network traffic that share at least a second trait; identifying a first suggested intent of the first set of workloads based upon metadata associated with the first set of workloads; identifying a second suggested intent of the second set of workloads based upon metadata associated with the second set of workloads; and consolidating a plurality of ports of the first set of workloads based at least in part on a network element associated with the first set of workloads into a set of ports.

In some instances of the aforementioned embodiments, the identifying the first set of workloads in the set of network traffic and the second set of workloads in the set of network traffic includes eliminating network traffic corresponding to a scanner. In various instances of the aforementioned embodiments, the identifying the first set of workloads in the set of network traffic and the second set of workloads in the set of network traffic includes eliminating incomplete workflows. In some such cases, the incomplete workflows are associated with a scanner accessing a closed port. In one or more such cases, the incomplete workflows are associated with a scanner accessing an open port and failing to respond to an acknowledgement returned from the open port.

In some instances of the aforementioned embodiments, the methods further include monitoring network activity to yield the set of network traffic. In some such instances, the monitoring network activity to yield the set of network traffic is done such that the network traffic does not include any traffic corresponding to a scanner or any incomplete workflows. In one or more instances of the aforementioned embodiments, the methods further include receiving an access control list including at least a first access control rule allowing defined activity over multiple network ports, and second access control rule allowing defined activity for workloads having the first suggested intent, and a third access control rule allowing defined activity for workloads having the second suggested intent. In some such instances, the multiple network ports may be a set of continuous network ports, or a set of discontinuous network ports. In one or more instances of the aforementioned embodiments, the methods further include: forward testing the access control list; modifying a default rule of the access control list from allow to block; and deploying the access control list.

Yet further embodiments provide network appliances that include: a processing resource, and a non-transitory computer-readable medium coupled to the processing resource. The non-transitory computer-readable medium has stored therein instructions that when executed by the processing resource cause the processing resource to: identify a first set of workloads in a set of network traffic that share at least a first trait, and a second set of workloads in the set of network traffic that share at least a second trait; identify a first suggested intent of the first set of workloads based upon metadata associated with the first set of workloads; identify a second suggested intent of the second set of workloads based upon metadata associated with the second set of workloads; and consolidate a plurality of ports of the first set of workloads based at least in part on a network element associated with the first set of workloads into a set of ports.

Yet other embodiments provide non-transitory computer-readable storage media embodying a set of instructions, which when executed by a processing resource, causes the processing resource to: identify a first set of workloads in a set of network traffic that share at least a first trait, and a second set of workloads in the set of network traffic that share at least a second trait; identify a first suggested intent of the first set of workloads based upon metadata associated with the first set of workloads; identify a second suggested intent of the second set of workloads based upon metadata associated with the second set of workloads; and consolidate a plurality of ports of the first set of workloads based at least in part on a network element associated with the first set of workloads into a set of ports.

Turning to FIG. 1A, network architecture 100 is shown in accordance with some embodiments. In the context of network architecture 100, a network security appliance 115 controls network traffic passing to/from a secured network 102. Secured network 102 may be any type of communication network known in the art. Those skilled in the art will appreciate that, secured network 102 can be a wireless network, a wired network or a combination thereof that can be implemented as one of the various types of networks, such as an Intranet, a Local Area Network (LAN), a Wide Area Network (WAN), an Internet, and the like. Further, network 102 can either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like.

The control applied by network security appliance 115 is in part based upon a network ACL 116 that includes a number of rules indicating which types of network traffic are allowed to pass to/from secured network 102, and which types of traffic are to be blocked from passing to/from secured network 102.

As more fully described below, a security orchestration system 120 is used to monitor network traffic passing through network security appliance 115 to determine applications that are operating in relation to secured network 102 (e.g., application A 110, application B 111, and application C 112), and workloads corresponding to operation of the respective applications. Such workloads involve communications between one or more of the applications and one or more of a database A 106, a database B 107, a database C 108, a web A 103, a web B 104, and a web C 105. Web A 103, web B 104, and web C 105 represent external network destinations.

Using this workload information, security orchestration system 120 generates access control rules for each of the identified applications, provides forward testing of the rules on an application level granularity, and generates an ACL for secured network 102. This generated ACL is deployed by installation in place of network ACL 116. In some embodiments, security orchestration system 120 is implemented on the same hardware as network security appliance 115 making it possible to more efficiently monitor network traffic passing to/from secured network 102.

Figure 1B:
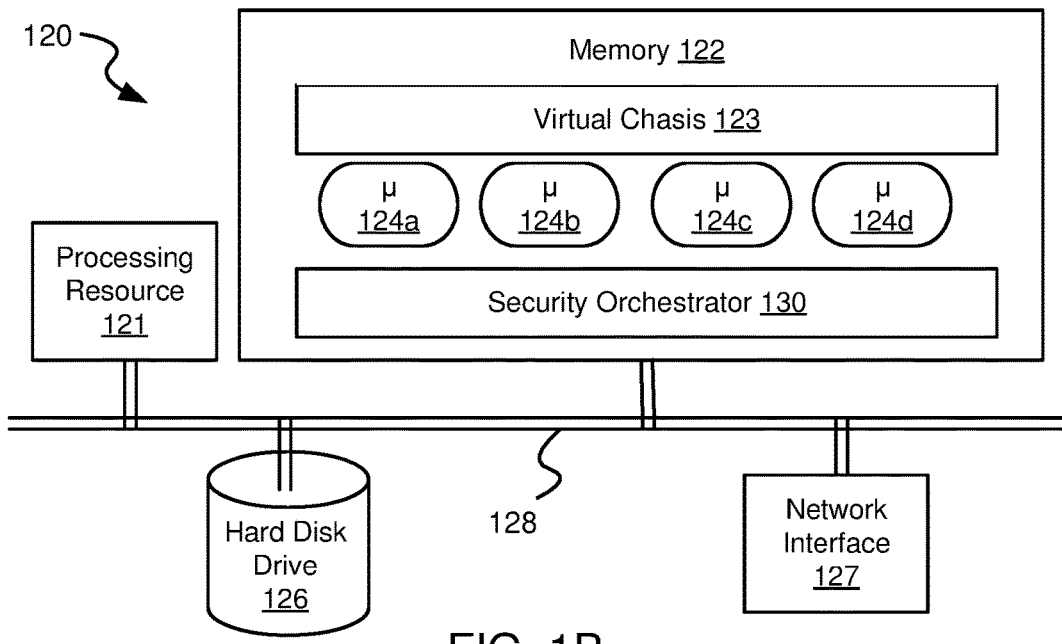

Turning to FIG. 1B, an implementation of security orchestration system 120 is shown in accordance with some embodiments. In this embodiment, security orchestration system 120 includes a processing resource 121, a memory 122, a hard disk drive 126, and a network interface 127 that are all communicably coupled via a system bus 128. Processing resource 121 may be any processors, group of processors, and/or processing circuitry that is capable of executing instructions maintained in memory 122. Based upon the disclosure provided herein, one of ordinary skill in the art will recognize a variety processing resources that may be used in relation to different embodiments.

Memory 122 may be a volatile memory such as random access memory (RAM), a non-volatile memory such as flash RAM, or some combination of volatile and non-volatile memory. Based upon the disclosure provided herein, one of ordinary skill in the art will recognize a variety of implementations of memory 122 that may be used in relation to different embodiments. Memory 122 stores a number of network security microservices (i.e., $\mu$ 124a, $\mu$ 124b, $\mu$ 124c, $\mu$ 124d). Such network security microservices consist of computer-executable instructions to perform one or more specific security services, are deployed based on configuration across available physical servers. In some cases, each microservice receives a configuration and tasks via a backplane of a virtual chassis 106, and returns status, statistics, and other information to the backplane.

The data processed by security orchestration system 120 is transferred from a microservice to another (higher hierarchy) microservice using a data plane. In some embodiments, during such a transfer, a lower microservice decides (based on configuration, current statistics, and other information) as to which next microservice to utilize. Such a decision may constitute a load-balancing decision to assure that the higher-hierarchy microservices are efficiently utilized. In other embodiments, the decision of which microservice to utilize is made by a more central entity.

As illustrated, security orchestration system 120 utilizes processing resources 121 to execute microservices 124 and other applications (e.g., virtual chassis 123, security orchestrator 130, etc.) stored in memory 104. A network interface 127 (e.g., fabric or interconnect that is wired or wireless) provides an apparatus for communicating with other devices in a network environment. Security orchestration system 120 may inspect traffic, detect threats, perform endpoint transformation processes, generate security policies (e.g., access control lists), and otherwise protect a network environment in part by using microservices 124.

In some embodiments, security orchestrator 130 is delivered (e.g., downloaded) in the form of a seed software application. The seed software application instantiates microservices of security orchestration system 120 on a host in a network environment. As used herein, a microservice container refers to where the microservice runs, for example, on a virtual machine. Once deployed, security orchestrator 130 utilizes a processing resources 121, memory 122, and network interface 127. In some scenarios, security can be added/configured using existing hardware and/or without purchasing additional rack devices for particular functionality. The seed software application may be installed on any one of a wide variety of hosts—be they slow or fast, low-cost or high-cost, commodity or customized, geographically dispersed, part of a redundancy scheme, or part of a system with regular back-ups.

In some embodiments, security orchestration system 120 utilizes network interface 127 to explore a network environment and to discover executing applications and corresponding workloads, and determine security settings to apply to various network applications and/or workloads, detect available hosts and hardware resources. Based on performing network environment discovery, security orchestration system 120, in some embodiments, may then offer or suggest available security tools for selection either through a graphical interface or via connections with existing enterprise management software. In one embodiment, security orchestration system 120 develops and deploys an access control list that may be used by a network security device in the network environment. Indeed, in some cases, security orchestration system 120 is implemented on the same hardware (i.e., processing resources 121, memory 122, hard disk drive 126, network interface 127, and system bus 128) as the network security device. By virtue of the network security device being "in-line" with data being received and transmitted in the network environment, it is able to use the access control list developed by security orchestrator 130 to allow acceptable traffic and block non-allowed traffic as part of implementing a ZTNA.

Security orchestrator 130 is configured to manage the evaluation of network traffic, determine endpoints within a networked environment, perform endpoint transformation process, and generate and deploy security policies that are executed on the transformed endpoints within the networked environment. Results of the aforementioned analysis are used by security orchestrator 130 to identify applications executing in the network environment and workloads corresponding to the identified applications.

Figure 1C:
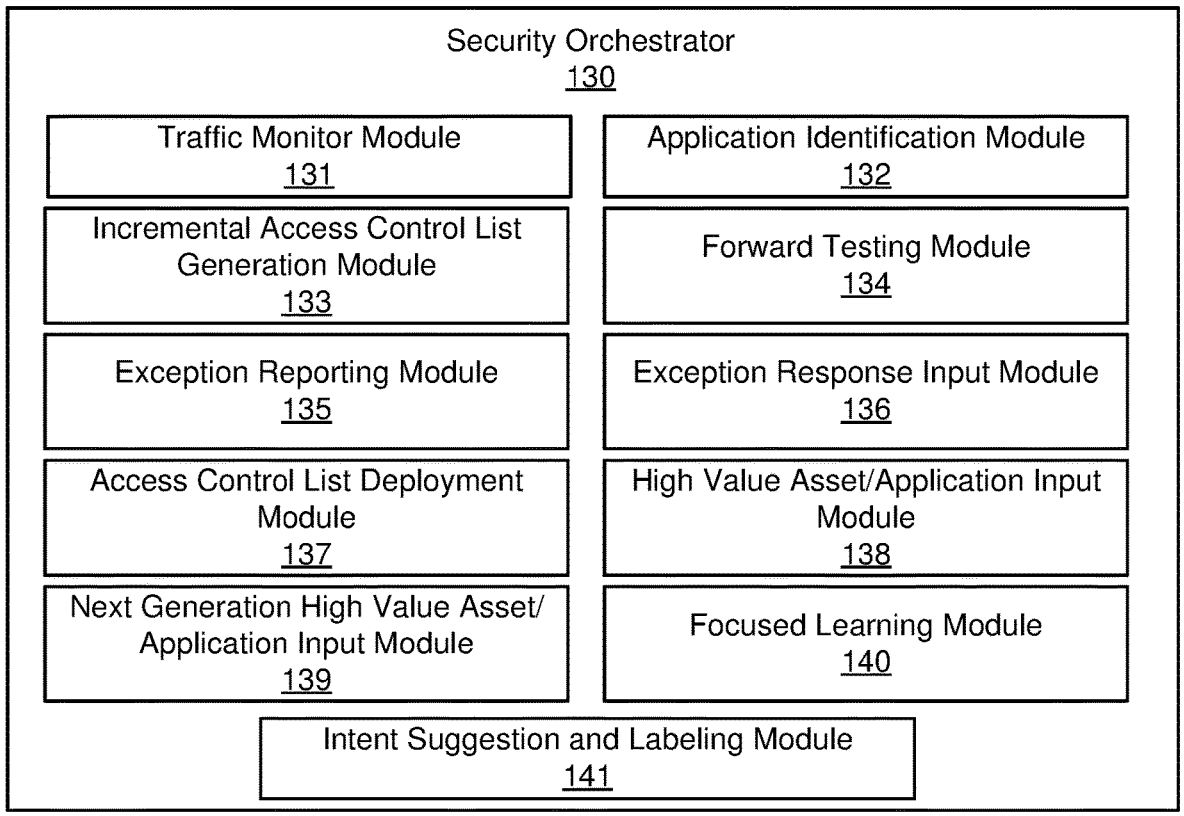

Turning to FIG. 1C, an implementation of security orchestrator 130 is shown in accordance with some embodiments. Security orchestrator 130 includes a traffic monitor module 131, an application identification module 132, an incremental access control list generation module 133, a forward testing module 134, an exception reporting module 135, an exception response input module 136, an access control list deployment module 137, a high value asset and/or application input module 138, a next generation high value asset and/or application identification module 139, a focused learning module 140, and an intent suggestion and labeling module 141.

Traffic monitor module 131 is configured to monitor network traffic that passes to and from secured network 102. Such traffic monitoring allows for identification of a number of workloads passing between various endpoints. This network traffic can be group into similar destinations, origins, and/or the like for analysis. In some embodiments, such network traffic monitoring may be done in accordance with that disclosed in U.S. Pat. No. 10,944,723 entitled "Systems and Methods for Managing Endpoints and Security Policies in a Networked Environment" that was previously incorporated by reference. In particular, FIGS. 6-8 and the corresponding discussion in the aforementioned incorporated reference describe one approach for monitoring network traffic that may be used in relation to some embodiments discussed herein. Such monitoring relies, at least in part, on meta information such as, for example, source and destination of the network traffic, the ports used for the network communication, the protocol used for the communication, other characteristics regarding the application communication that are derived from deep-packet inspection of the traffic.

Application identification module 132 is configured to use the network traffic identified by traffic monitor module 131 to identify applications executing within the network along with the workloads associated with the identified applications. In some embodiments, such identification of applications and corresponding workloads may be done in accordance with that disclosed in U.S. Pat. No. 10,944,723 entitled "Systems and Methods for Managing Endpoints and Security Policies in a Networked Environment" that was previously incorporated by reference. In particular, FIGS. 9-11 and the corresponding discussion in the aforementioned incorporated reference describe one approach for transforming network communication metadata collected as part of a network traffic monitoring process, and using the transformed metadata for network identification (e.g., classification) processes. Application identification module 132 forms a global list of all identified applications and workloads corresponding to the respective applications is assembled, and identifies all workloads in the global list as not secured. Identifying a workload as not secure may be done, for example, by setting a secure flag associated with the particular workload as false. Based upon the disclosure provided herein, one of ordinary skill in the art will recognize a variety of approaches that may be used for identifying a workload as not secure.

Incremental access control list generation module 133 is configured to incorporate access control rules for given applications incrementally into an ACL. This includes adding rules governing workloads for a newly selected application from the global list of all identified applications and workloads corresponding to the respective applications to the ACL below rules corresponding to a previously secured application, and prior to a default rule. The default rule allows network traffic from any source to any destination. After forward testing for the newly updated ACL is completed and found acceptable, the ACL is again updated to indicate that the most recently selected application is considered secure and/or ZTNA compliant. The process can then be repeated for the next application which is added to the ACL after the previously secured applications and before the default rule. This process is more fully described below in relation to FIG. 2.

Forward testing module 134 is configured to deploy an interim ACL and to monitor any network traffic that is allowed to pass by the default rule. As the rules in the ACL are processed sequentially and once a network communication has been allowed or blocked by one rule, no additional rules are considered. Because the default rule is the last rule in the ACL, any network traffic that is allowed because of the default rule was not accounted for by any other rule. Such traffic is flagged by the forward testing module for consideration by a network administrator. In some cases, forward testing module 134 is configured to operate similar to that discussed below in relation to FIG. 5.

Exception reporting module 135 is configured to report any network traffic that is allowed under a default rule of the incrementally going ACL. As the ACL is being forward tested after the addition of each application, only the most recently added application has not yet been fully secured. As such, any network traffic allowed because of the default rule is likely either part of a workload not originally identified as part of the newly added application or is some type of non-allowed network traffic. Accordingly, the report provided to the network administrator includes a relatively small amount of information compared with that which would have possibly generated if an entire ACL for a network was being forward tested at once. Further, as only one application operating in the network has not previously been fully secured (i.e., the most recently selected application), a network administrator does not have to consider every application to identify what application the network traffic corresponds. Rather, the network administrator need only consider the most recently selected application and the possibility of a non-allowed source or destination. This greatly simplifies the processes to be performed by a network administrator tasked with developing a ZTNA policy for a network.

Exception response input module 136 is configured to accept changes to an incrementally developing ACL from a network administrator. In some embodiments, exception response input module 136 is an editing tool that allows the network administrator to make changes directly to the ACL. Based upon the disclosure provided herein, one of ordinary skill in the art will recognize a variety mechanisms and apparatus that may be used to receive changes and make modifications to an ACL in accordance with different embodiments.

Access control list deployment module 137 is configured to install the incrementally developed ACL into network appliance 115 where it will be relied upon to control access to secured network 102. In some cases, this installation is done the same way an incrementally developing ACL is forward tested. In some embodiments, the installation is complete at the same time the last modifications to the ACL are completed and the default rule is changed to block to make secure network 102 ZTNA compliant. Based upon the disclosure provided herein, one of ordinary skill in the art will recognize a variety of approaches for deploying an ACL developed in accordance with embodiments discussed herein.

High value asset and/or application input module 138 is configured to receive an indication of a high value asset(s) and/or application(s) from, for example, a user interface; and to update a focus list to include the received high value asset(s) and/or application(s). The network elements included in the focus list are those that will be used to focus the network traffic monitoring and formatting similar to that discussed below in relation to FIGS. 6-7.

Next generation high value asset and/or application identification module 139 is configured to identify one or more network elements from workloads touching network elements previously included in the focus list, and to update the focus list to include the identified elements. Again, the network elements included in the focus list are those that will be used to focus the network traffic monitoring and formatting similar to that discussed below in relation to FIGS. 6-7.

Focused learning module 140 is configured to implement a focused learning approach for developing ZTNA policy. An example of such focused learning approaches are discussed below in relation to FIGS. 6-7.

Intent suggestion and labeling module 141 is configured to identify suggested intents for grouped workloads, label the grouped workloads, and consolidate multiple ports associated with similar workloads. Intent suggestion and labeling module 141 may perform various of the functions discussed below in relation to FIG. 10.

Figures 1D, 3:
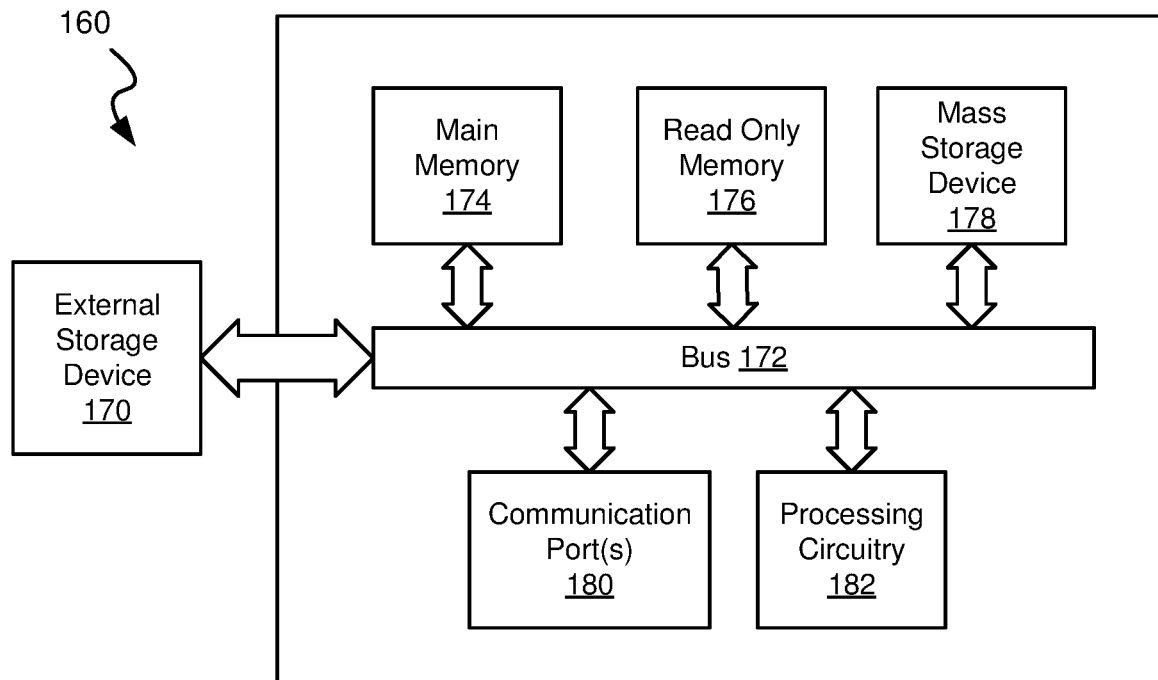
FIG. 3 is a graphical representation of an example access control list designed for zero trust network access in a network environment with a single application.

Turning to FIG. 1D, an example computer system 160 is shown in which or with which embodiments of the present disclosure may be utilized. As shown in FIG. 1B, computer system 160 includes an external storage device 170, a bus 172, a main memory 174, a read-only memory 176, a mass storage device 178, one or more communication ports 1010, and one or more processing resources (e.g., processing circuitry 182). In one embodiment, computer system 160 may represent some portion of security orchestration system 120, network security appliance 115, one or more computers on which applications A 110, application B 111, and/or application C 112 are executing, and/or one or more network servers governing database A 106, database B 107, and/or database C 108.

Those skilled in the art will appreciate that computer system 160 may include more than one processing resource 182 and communication port 180. Non-limiting examples of processing resources include, but are not limited to, Intel Quad-Core, Intel i3, Intel i5, Intel i7, Apple M1, AMD Ryzen, or AMD® Opteron® or Athlon MP® processor(s), Motorola® lines of processors, FortiSOC™ system on chip processors or other future processors. Processors 182 may include various modules associated with embodiments of the present disclosure.

Communication port 180 can be any of an RS-232 port for use with a modem-based dialup connection, a 10/100 Ethernet port, a Gigabit, 10 Gigabit, 25G, 40G, and 100G port using copper or fiber, a serial port, a parallel port, or other existing or future ports. Communication port 760 may be chosen depending on a network, such as a Local Area Network (LAN), Wide Area Network (WAN), or any network to which the computer system connects.

Memory 174 can be Random Access Memory (RAM), or any other dynamic storage device commonly known in the art. Read only memory 176 can be any static storage device(s) e.g., but not limited to, a Programmable Read Only Memory (PROM) chips for storing static information e.g. start-up or BIOS instructions for the processing resource.

Mass storage 178 may be any current or future mass storage solution, which can be used to store information and/or instructions. Non-limiting examples of mass storage solutions include Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1300), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 172 communicatively couples processing resource(s) with the other memory, storage and communication blocks. Bus 172 can be, e.g. a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processing resources to software system.

Optionally, operator and administrative interfaces, e.g., a display, keyboard, and a cursor control device, may also be coupled to bus 172 to support direct operator interaction with the computer system. Other operator and administrative interfaces can be provided through network connections connected through communication port 180. External storage device 190 can be any kind of external hard-drives, floppy drives, IOMEGA® Zip Drives, Compact Disc-Read Only Memory (CD-ROM), Compact Disc-Rewritable (CD-RW), Digital Video Disk-Read Only Memory (DVD-ROM). Components described above are meant only to show various possibilities. In no way should the aforementioned example computer system limit the scope of the present disclosure.

Figure 2:
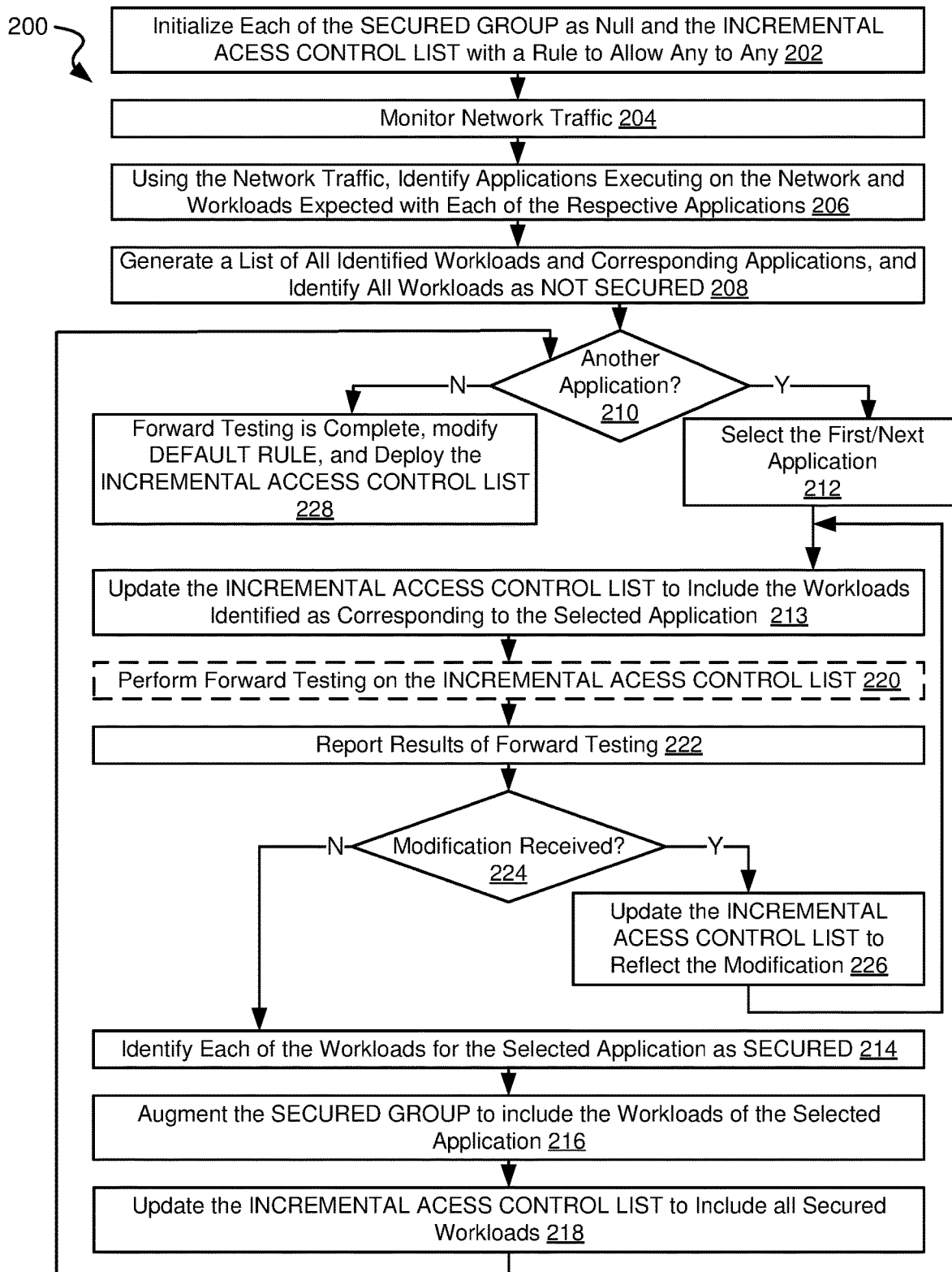
FIG. 2 is a flow diagram showing a method in accordance with various embodiments for performing forward testing at an application level granularity.

Turning to FIG. 2, a flow diagram 200 shows a method in accordance with various embodiments for performing forward testing at an application level granularity. In particular flow diagram 200 shows a method that includes developing a multi-application ACL that is forward tested at an application level. To aid in understanding the multi-application ACL developed using the method of FIG. 2, FIG. 3 graphically represents an example ACL 300 designed for zero trust network access in a network environment with a single application, but is not designed to accommodate application level forward testing. As shown, ACL 300 includes four rules—three (Rule 1, Rule 2, and Rule 3) of which are designed specifically for an Application A and to allow access to a web from a secured network, and one (Rule 4) of which is a default rule that serves to block all other traffic. In particular, Rule 1 allows any traffic from the secured network to pass to a web using transmission control protocol (TCP) on port 80, Rule 2 allows traffic from the web to Application A using TCP via port 443, and Rule 3 allows traffic from Application A to a database using TCP via port 3016. Rule 4 blocks all traffic that does not qualify under one of Rule 1, Rule 2, or Rule 3.

In operation, each of the rules of ACL 300 are applied in order. Thus, when traffic is received, it is determined if it qualifies under Rule 1 (i.e., is traffic from the secured network to the web). If the traffic qualifies, it is allowed and none of Rules 2-4 are considered. Alternatively, where the traffic does not qualify under Rule 1, qualification under Rule 2 (i.e., is the traffic from the web to Application A) is considered. If the traffic qualifies under Rule 2, it is allowed and none of Rules 3-4 are considered. Alternatively, where the traffic does not qualify under Rule 3, qualification under Rule 3 (i.e., is the traffic from Application A to the database) is considered. If the traffic qualifies under Rule 3, it is allowed and Rule 4 is not considered. Alternatively, the traffic is blocked under Rule 4. This default blockage effectively enforces ZTNA by disallowing all unidentified traffic.

While ACL 300 governs workloads from only a single application (i.e., application A), one of ordinary skill in the art will appreciate that ACL 300 can be modified to include a large number of rules governing workloads associated with a number of applications over which the ACL has oversight (i.e., applications running on a secured network governed by the ACL). Such modification would include the addition of rules corresponding to the additional workloads and/or applications between Rule 3 and Rule 4. The default traffic blocking rule is the last rule in the modified ALC to assure ZTNA compliance. Such a modified ACL, however, requires forward testing of all rules at once and does not provide for testing at an application level granularity.

Figure 4A:
FIGS. 4A-4F graphically represent generation of an access control list using forward testing at an application granularity and providing zero trust network access for a network environment running three applications in accordance with some embodiments.

Turning again to FIG. 2, an ACL is generated that is forward tested at an application level granularity. Following flow diagram 200, a SECURED GROUP to null and an INCREMENTAL ACCESS CONTROL LIST are initialized to include a single rule (i.e., a default rule) to allow network traffic from any source to any destination (block 202). Turning to FIG. 4A, a graphical representation of a newly initialized incremental ACL 400 is shown that includes only a single rule (i.e., Rule 1) that allows network traffic from any source to any destination. Where such an ACL is used, no traffic would be blocked by, for example, a network firewall relying on the ACL.

Returning to FIG. 2, network traffic is monitored that passes to and from the network to be supported by the ACL developed using the method of FIG. 2 (block 204). Such traffic monitoring allows for identification of a number of workloads passing between various endpoints. This network traffic can be group into similar destinations, origins, and/or the like for analysis. In some embodiments, such network traffic monitoring may be done in accordance with that disclosed in U.S. Pat. No. 10,944,723 entitled "Systems and Methods for Managing Endpoints and Security Policies in a Networked Environment" that was previously incorporated by reference. In particular, FIGS. 6-8 and the corresponding discussion in the aforementioned incorporated reference describe one approach for monitoring network traffic that may be used in relation to some embodiments discussed herein. Such monitoring relies, at least in part, on meta information such as, for example, source and destination of the network traffic, the ports used for the network communication, the protocol used for the communication, other characteristics regarding the application communication that are derived from deep-packet inspection of the traffic.

Using the network traffic identified in the monitoring process (block 204), applications executing within the network along with the workloads associated with the applications are identified (block 206). In some embodiments, such identification of applications and corresponding workloads may be done in accordance with that disclosed in U.S. Pat. No. 10,944,723 entitled "Systems and Methods for Managing Endpoints and Security Policies in a Networked Environment" that was previously incorporated by reference. In particular, FIGS. 9-11 and the corresponding discussion in the aforementioned incorporated reference describe one approach for transforming network communication metadata collected as part of a network traffic monitoring process, and using the transformed metadata for network identification (e.g., classification) processes.

A global list of all identified applications and workloads corresponding to the respective applications is assembled (block 208). All workloads in the global list are identified as not secured. Identifying a workload as not secure may be done, for example, by setting a secure flag associated with the particular workload as false. Based upon the disclosure provided herein, one of ordinary skill in the art will recognize a variety of approaches that may be used for identifying a workload as not secure.

Figure 4B:

It is determined whether any applications remain in the global list that have not yet been processed for incorporation into the INCREMENTAL ACCESS CONTROL LIST (block 210). Where one or more applications remain for processing (block 210), the first/next application in the global list is selected (block 212), and the INCREMENTAL ACCESS CONTROL LIST is updated to include all workloads identified as corresponding to the selected application (block 213). Turning to FIG. 4B, a graphical representation of an incremental ACL 410 is shown after adding a first selected application (i.e., Application A) that includes three identified workloads (traffic to a web A, traffic from web A to Application A, and traffic from Application A to Database A). The three workloads associated with the first selected application occupy the first three rules (Rule 1, Rule 2, and Rule 3), and the default rule is moved to the last rule (Rule 4). While incremental ACL 410 is shown with Application A having three workloads, one of ordinary skill in the art will recognize that a different application may exhibit fewer or more identified workloads, and that the identified workloads for the application may be different and include network traffic directed between different network endpoints.

Returning to FIG. 2, forward testing is applied using the INCREMENTAL ACCESS CONTROL LIST (block 220). This block is shown in dashed lines as detail of this block is set forth in relation to FIG. 5 below. During forward testing, any network traffic that is allowed because of the default rule (i.e., any network traffic not allowed by a rule specific to a workload of a particular application) is flagged.

The flagged network traffic is reported to, for example, a network administrator as forward testing results (block 222).

As only the most recently selected application (i.e., Application A in the case of incremental ACL 410, or Application B in the case of incremental ACL 430) has not yet been fully secured, any network traffic allowed because of the default rule is likely either part of a workload not originally identified as part of the newly selected application or is some type of non-allowed network traffic. Accordingly, the report provided to the network administrator includes a relatively small amount of information compared with that which would have possibly generated if an entire ACL for a network was being forward tested at once. Further, as only one application operating in the network has not previously been fully secured (i.e., the most recently selected application), a network administrator does not have to consider every application to identify what application the network traffic corresponds. Rather, the network administrator need only consider the most recently selected application and the possibility of a non-allowed source or destination. This greatly simplifies the processes to be performed by a network administrator tasked with developing a ZTNA policy for a network. Based upon the disclosure provided herein, one of ordinary skill in the art will recognize a variety of other advantages that may be achieved in accordance with embodiments discussed herein, and a variety of reports that may be produced and provided based upon the forward testing applied to the INCREMENTAL ACCESS CONTROL LIST.

It is determined whether a network administrator reviewing the reported results of forward testing has indicated a desired change to the rules in the INCREMENTAL ACCESS CONTROL LIST (block 224). Where a change is indicated (block 224), the INCREMENTAL ACCESS CONTROL LIST is modified to reflect the received change request (block 226) and the processes of blocks 220-224 are repeated for the updated INCREMENTAL ACCESS CONTROL LIST. The changes should be limited to the rules corresponding to the most recently selected application. Based upon the disclosure provided herein, one of ordinary skill in the art will recognize a variety of approaches that may be used in relation to different embodiments for a network administrator to indicate a change. As one example, a network administrator may simply edit the INCREMENTAL ACCESS CONTROL LIST to make a desired change.

Alternatively where no changes are indicated (block 224), the most recently selected application is considered compliant with a ZTNA policy. In such a situation, each of the workloads associated with the most recently selected application are identified as secure (block 214). Identifying a workload as secure may be done, for example, by setting a secure flag associated with the particular workload as true. Based upon the disclosure provided herein, one of ordinary skill in the art will recognize a variety of approaches that may be used for identifying a workload as secure.

Further, the SECURED GROUP is augmented to include all of the workloads that were newly identified as secured (block 216). For the first selected application, such augmenting of the SECURED GROUP includes adding the workloads for the most recently selected application to an otherwise empty group. In contrast, for the second and later applications that are being processed, augmenting the SECURED GROUP will include adding the workloads newly identified as secured to those previously included in the SECURED GROUP.

Additionally the INCREMENTAL ACCESS CONTROL LIST is updated to include all secure workloads (block 218). This includes setting forth rules specifically allowing traffic of each workload corresponding to the selected application, and rules general to the SECURED GROUP. The rules general to the SECURED GROUP are two: (1) blocking traffic from any source to any destination included in the SECURED GROUP using any protocol or port, and (2) blocking traffic from any source included in the SECURED GROUP to any destination using any protocol or port.

Figure 4C:

Turning to FIG. 4C, a graphical representation of an incremental access control list 420 is shown that includes a single application (i.e., Application A) that includes three identified workload tiers/groups (traffic to a web A, traffic from web A to Application A, and traffic from Application A to Database A) that is considered compliant with a ZTNA policy. Two rules are added to incremental access control list 410: a rule (i.e., Rule 4) blocking any traffic from the SECURED GROUP to any destination, and a rule (i.e., Rule 5) blocking any traffic from any destination to the SECURED GROUP. As the rules are processed in order, any traffic allowed for Application A will have been processed under Rule 1, Rule 2, or Rule 3, and any other traffic associated with Application A will be blocked under Rule 4 or Rule 5. All other traffic unrelated to Application A will be allowed under the default rule (Rule 6).

Figure 4D:

Returning to FIG. 2, after updating the INCREMENTAL ACCESS CONTROL LIST to reflect all rules related to the most recently selected application (blocks 214-218), it is determined whether another application remains in the global list that have not yet been processed for incorporation into the INCREMENTAL ACCESS CONTROL LIST (block 210).

Where one or more applications remain for processing (block 210), the next application in the global list is selected (block 212), and the INCREMENTAL ACCESS CONTROL LIST is updated to include all workloads identified as corresponding to the selected application (block 213). Updating the INCREMENTAL ACCESS CONTROL LIST includes adding a rules prior to the default rule, where the added rules are specific to each of identified workloads and specifically allow network traffic associated with the identified workloads. Turning to FIG. 4D, a graphical representation of an incremental ACL 430 is shown after adding a second selected application (i.e., Application B) that includes three identified workload tiers/groups (traffic to a web B, traffic from web B to Application B, and traffic from Application B to Database B). The three workload tiers/groups associated with the second selected application occupy the three rules immediately prior to the default rule (Rule 6, Rule 7, and Rule 8), and the default rule is moved to the last rule (Rule 9). While incremental ACL 430 is shown with Application B having three workloads, one of ordinary skill in the art will recognize that a different application may exhibit fewer or more identified workloads, and that the identified workloads for the application may be different and include network traffic directed between different network endpoints Returning to FIG. 2, forward testing is applied using the newly updated INCREMENTAL ACCESS CONTROL LIST (block 220). Again, during forward testing any network traffic that is allowed because of the default rule (i.e., any network traffic not allowed by a rule specific to a workload of a particular application) is flagged.

The flagged network traffic is reported to the network administrator as forward testing results (block 222). As only the most recently selected application has not yet been fully secured, any network traffic allowed because of the default rule is likely either part of a workload not originally identified as part of the newly selected application or is some type of non-allowed network traffic. In the case of forward testing incremental ACL 430, any network traffic allowed because of the default rule is likely either part of a workload not originally identified as part of Application B or is some type of non-allowed network traffic. Traffic corresponding to Application A should not occur as it was secured during a prior pass through blocks 220, 222, 226, 214, 216, 218. Again, this greatly reduces the complexity faced by a network administrator tasked with developing a ZTNA policy for a network.

It is determined whether a network administrator reviewing the reported results of forward testing has indicated a desired change to the rules in the INCREMENTAL ACCESS CONTROL LIST (block 224). Where a change is indicated (block 224), the INCREMENTAL ACCESS CONTROL LIST is modified to reflect the received change request (block 226) and the processes of blocks 220-224 are repeated for the updated INCREMENTAL ACCESS CONTROL LIST. Again, the changes should be limited to the rules corresponding to the most recently selected application.

Alternatively where no changes are indicated (block 224), the most recently selected application (e.g., Application B in the case of incremental ACL 430) is considered compliant with the ZTNA policy. In such a situation, each of the workloads associated with the most recently selected application are identified as secure (block 214). Identifying a workload as secure may be done, for example, by setting a secure flag associated with the particular workload as true. Based upon the disclosure provided herein, one of ordinary skill in the art will recognize a variety of approaches that may be used for identifying a workload as secure.

Further, the SECURED GROUP is augmented to include all of the workloads that were newly identified as secured (block 216). Again, for the second and later applications that are being processed, augmenting the SECURED GROUP will include adding the workloads newly identified as secured to those previously included in the SECURED GROUP.

Additionally the INCREMENTAL ACCESS CONTROL LIST is updated to include all secure workloads (block 218). This includes setting forth rules specifically allowing traffic of each workload corresponding to the selected application, and rules general to the SECURED GROUP. The rules general to the SECURED GROUP are two: (1) blocking traffic from any source to any destination included in the SECURED GROUP using any protocol or port, and (2) blocking traffic from any source included in the SECURED GROUP to any destination using any protocol or port. These general rules are moved to the two rules immediately preceding the default rule in the INCREMENTAL ACCESS CONTROL LIST.

Figure 4E:

Turning to FIG. 4E, a graphical representation of an incremental access control list 440 is shown that includes two applications (i.e., Application A and Application B) that each includes three identified workloads (traffic to a web A, traffic from web A to Application A, and traffic from Application A to Database A; and traffic to a web B, traffic from web B to Application B, and traffic from Application B to Database B) that are considered compliant with a ZTNA policy. The rules corresponding to the recently updated SECURED GROUP are included as Rule 7 and Rule 8 are included immediately prior to the default rule (i.e., Rule 9). As the rules are processed in order, any traffic allowed for Application A will have been processed under Rule 1, Rule 2, or Rule 3; any traffic allowed for Application B will have been processed under Rule 4, Rule 5, or Rule 6; and any other traffic associated with either Application A or Application B will be blocked under Rule 7 or Rule 8. All other traffic unrelated to either Application A or Application B will be allowed under the default rule (Rule 9).

Figure 4F:

Returning to FIG. 2, after updating the INCREMENTAL ACCESS CONTROL LIST to reflect all rules related to the most recently (blocks 214-218), it is determined whether another application remains in the global list that have not yet been processed for incorporation into the INCREMENTAL ACCESS CONTROL LIST (block 210). Once no additional applications remain for processing in the global list (block 210), forward testing is complete (block 228). The default rule is modified from allow to block to enforce ZTNA and the INCREMENTAL ACCESS CONTROL LIST is deployed. Such deployment may be as simple as beginning operation of the network where a network security appliance uses the INCREMENTAL ACCESS CONTROL LIST to control what network traffic is allowed to pass to and from a secured network. Turning to FIG. 4F, a graphical representation is shown of an incremental access control list 450 that is incremental ACL 440 where the default rule (i.e., Rule 9) is changed from allow to block in accordance with the process of block 228 of FIG. 2.

While the examples in FIGS. 4A-4F show an incremental ACL developed with two applications, one of ordinary skill in the art will recognize that the processes of FIG. 2 may be repeated for any number of applications to be operated in a network environment. Further, while the applications shown in the examples in FIGS. 4A-4F each include the same number and types of workloads, one of ordinary skill in the art will appreciate other types of applications will include different types and numbers of workloads, and may be handled as discussed above in relation to FIG. 2.

Figure 5:
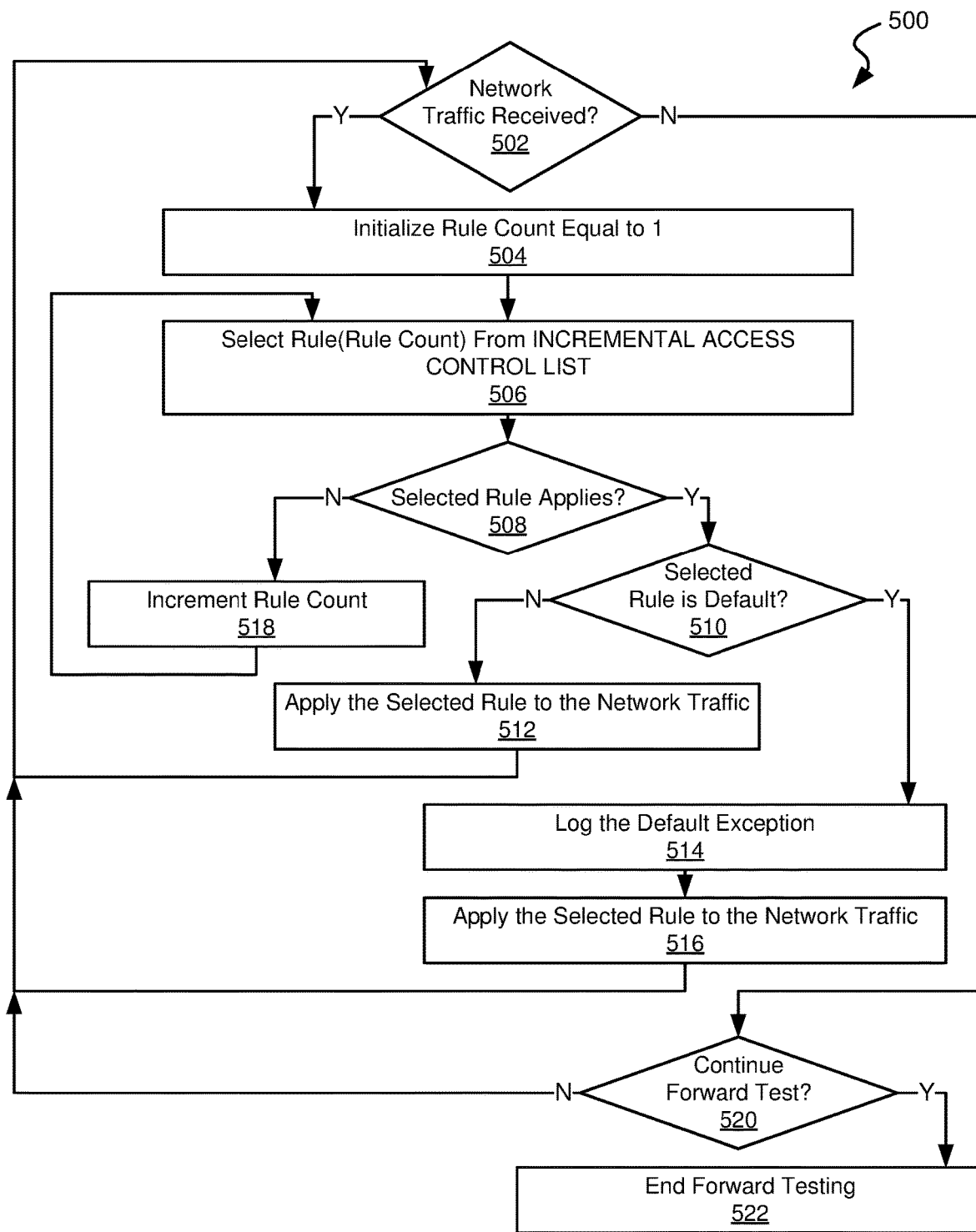
FIG. 5 is a flow diagram showing a method in accordance with various embodiments for forward testing an access control list on an application granularity.

Turning to FIG. 5, a flow diagram 500 shows a method in accordance with some embodiments for forward testing an ACL on an application granularity. Following flow diagram 500, it is determined if a network traffic communication has been received (block 502). A network traffic communication is received any time an attempt is made to access an endpoint outside of a secured network from within the secured network or any time an attempt is made to access an endpoint within the secured network from beyond the secured network. Based upon the disclosure provided herein, one of ordinary skill in the art will recognize a variety of network traffic that may be identified in relation to the operations of flow diagram 500.

Periodically, it is determined whether a timeout condition has been met (block 520). Such a timeout condition may be a certain time or may be a certain number of received network traffic communications. Based upon the disclosure provided herein, one of ordinary skill in the art will recognize a variety of timeout conditions that may be used. Where the timeout condition has not been met (block 520), processing is returned to await the next network traffic. Alternatively, where the timeout condition has been met (block 520), forward testing is ended (block 522) leaving the logged default exceptions.

Where network traffic has been received (block 502), a rule count is initialized at "1" (block 504) and the rule corresponding to the rule count (in this case Rule 1) is selected from the INCREMENTAL ACCESS CONTROL LIST (block 506). It is determined where the selected rule applies to the received (block 508). Using ACL 420 of FIG. 4A as a specific example, it is determined whether the network traffic is destined for web A using TCP via port 80.

Where the selected Rule applies to the received network traffic (block 508), it is determined whether the selected rule is the default rule for the INCREMENTAL ACCESS CON- TROL LIST (i.e., the last rule in the ACL)(block 510). Where it is not the default rule (block 510), the selected rule is applied and the process returns to block 502 to await the next network traffic (block 512). Thus, using the example of FIG. 4A, where the selected rule is Rule 1 and the destination of the network traffic is to web A, the traffic is allowed and processing is returned to await the next network traffic.

Alternatively, where the selected rule is the default rule (block 510), a default exception is logged (block 514). Such a default exception indicates that network traffic was received that was not properly handled by any of the preceding rules in the INCREMENTAL ACCESS CONTROL LIST. The default rule is applied to the network traffic and the process returns to block 502 to await the next network traffic (block 512). Using the example of FIG. 4A, where the selected rule is the default rule (i.e., Rule 6) the network traffic is allowed and processing is returned to await the next network traffic.

Alternatively, where the selected rule does not apply to the received network traffic (block 508), the rule count is incremented (block 518) and the rule indicated by the rule count is selected (block 506) before the processes of blocks 508-516 are repeated for the next rule. This process of sequencing through the rules in the INCREMENTAL ACCESS CONTROL LIST continues until rule count is incremented to the default rule, and the processes of blocks 510-516 are followed for the default rule.

If the INCREMENTAL ACCESS CONTROL LIST is correct, the default exceptions will not include any network traffic related to the first application. Rather, all of the default traffic will be either undesired or germane to another application. As discussed in relation to FIG. 2 above, where the default traffic includes traffic germane to the most recently selected application (in the case of FIG. 4A this would be Application A; in the case of FIG. 4B this would be Application B; and in the case of FIG. 4C this would be Application C) an administrator would see this and modify the INCREMENTAL ACCESS CONTROL LIST to accommodate the network traffic improperly handled under the default rule. As such, by the time forward testing of the INCREMENTAL ACCESS CONTROL LIST including only the first selected application is complete, rules specific to the first selected application have been forward tested and validated. Again using FIG. 4A as an example, this would mean that Rule 1, Rule 2, and Rule 3 of ACL 400 would be validated.

At this juncture, the next pass through the forward testing process of flow diagram 500 would test the INCREMENTAL ACCESS CONTROL LIST after adding workloads for the next application. Because the rules specific to the prior selected application are already validated, any consideration of network traffic processed by the default rule need only be considered from the perspective of the rules specific to the workloads specific to the newly selected application. Thus, using FIG. 4B as an example, any default exceptions logged when forward testing using ACL 410 are considered only in light of Rule 4, Rule 5, and Rule 6 that are specific to the Application B. The same is true for ACL 420 where all of Rule 1, Rule 2, Rule 3, Rule 4, Rule 5, Rule 6 were verified and validated in prior forward testing of ACL 400 and ACL 410, leaving only Rule 7, Rule 8, and Rule 9 that are specific to the Application C for verification and validation. As mentioned above, by performing forward testing at an application granularity, the validity of only a small number of rules of an overall ACL need be considered at a given time.

Figure 6A:
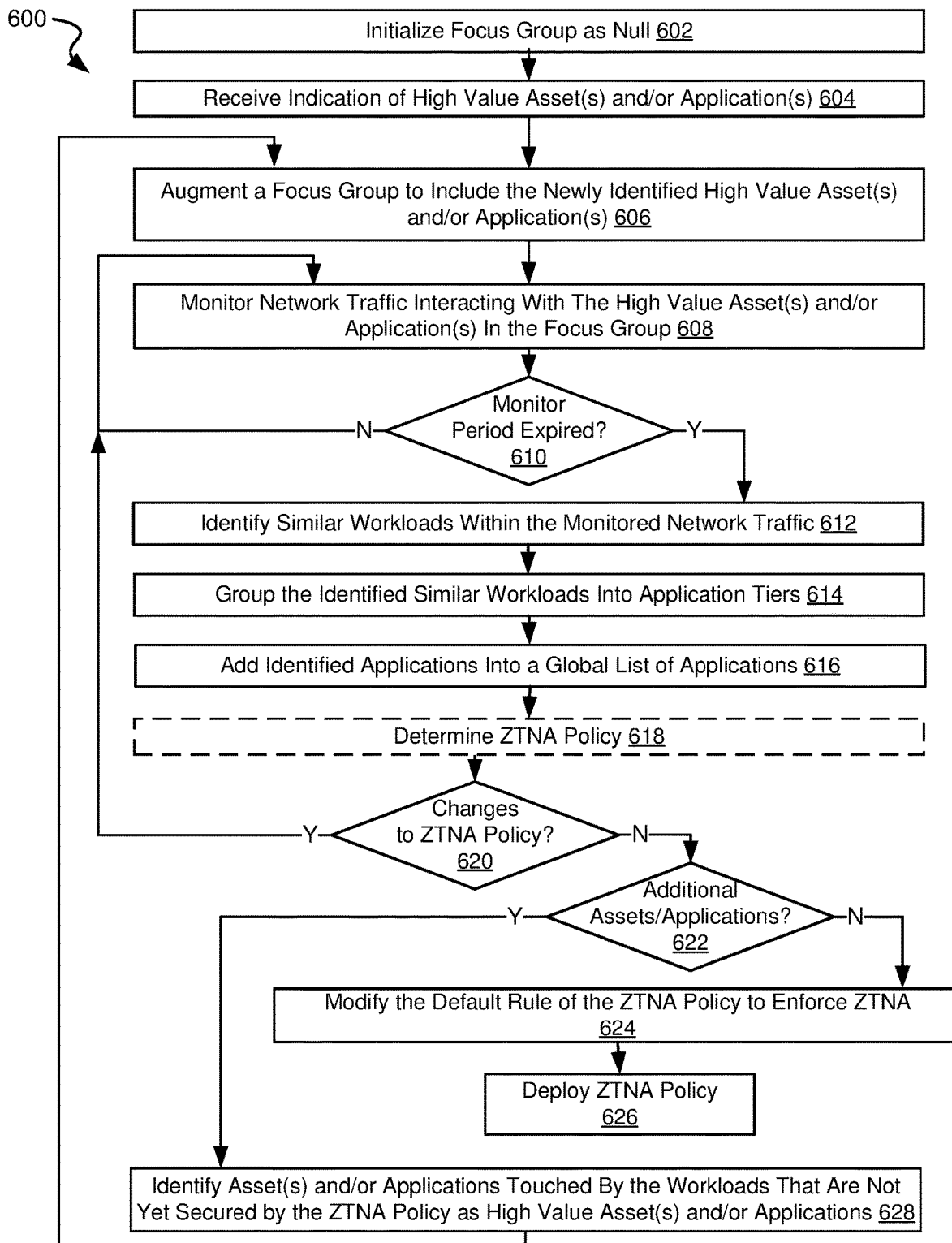
FIGS. 6A-6B are flow diagrams showing a method in accordance with some embodiments for developing a zero trust network access from the perspective of one or more identified network elements.
Figure 6B:
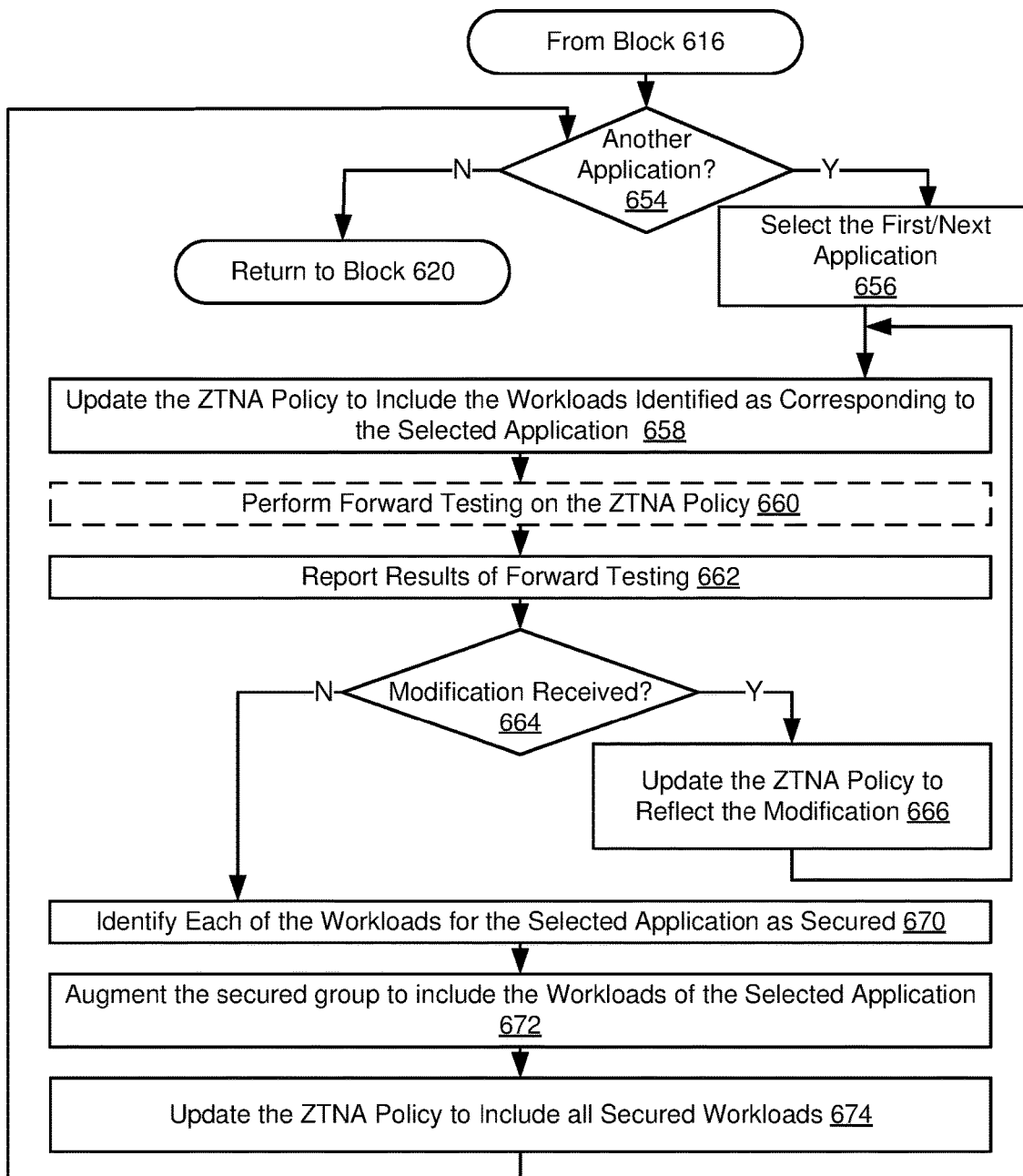

Turning to FIGS. 6A-6B, flow diagram 600 and flow diagram 616 show a method in accordance with some embodiments for developing a zero trust network access from the perspective of one or more identified network elements. Turning specifically to FIG. 6A and following flow diagram 600, a focus group is initialized as null (block 602), and an indication of a high value asset(s) and/or application(s) is received (block 604). The high value asset(s) and/or applications may be identified, for example, by a network administrator reviewing a physical asset map of a network and selecting one or more of the assets and/or applications operating in the network as a focus for a machine learning module responsible for identifying workloads and determining applications to which the workloads belong. As an example, the network administrator may identify a particular network database as a high value asset. The identified high value asset(s) and/or application(s) are then provided as an input. Based upon the disclosure provided herein, one of ordinary skill in the art will recognize a variety of high value asset(s) and/or application(s) that may be selected in accordance with different embodiments, and a number of mechanisms that may be used to identify the selected high value asset(s) and/or application(s) for processing.

The focus group is augmented to include the newly identified high value asset(s) and/or application(s) (block 606). This focus group becomes the focus of the identification of workloads and applications to be secured.

Network traffic is monitored that is either transmitted to or received from one of the high value asset(s) and/or application(s) included in the focus group (block 608). Such traffic monitoring allows for identification of a number of workloads directly touching the specifically identified network elements. By focusing the monitoring on those network elements specifically identified in the focus group, only a subset of the overall network traffic is considered for grouping into similar destinations, origins, and/or the like for analysis. In some embodiments, such network traffic monitoring may be done in accordance with that disclosed in U.S. Pat. No. 10,944,723 entitled "Systems and Methods for Managing Endpoints and Security Policies in a Networked Environment" that was previously incorporated by reference. In particular, FIGS. 6-8 and the corresponding discussion in the aforementioned incorporated reference describe one approach for monitoring network traffic that may be used in relation to some embodiments discussed herein. Such monitoring relies, at least in part, on meta information such as, for example, source and destination of the network traffic, the ports used for the network communication, the protocol used for the communication, other characteristics regarding the application communication that are derived from deep-packet inspection of the traffic.

This process of monitoring (block 608) is continued for a defined period (block 610). The defined period may be fixed or user programmable. In some cases, the defined period is set to allow for a sufficient number of network transactions to occur such that multiple instances of workloads associated with applications may be identified, and thus facilitate the automated identification of assets and corresponding workloads within the network environment.

Once the monitor period has expired (block 610), similar workloads within the monitored network traffic are identified (block 612). The similarity of the workloads may be identified based upon any number of commonality in metadata about the workloads. For example, all workloads from a particular endpoint or to a particular endpoint may be grouped. As another example, all workloads from a particular endpoint on a particular port may be grouped. As yet another example, all workloads to a particular endpoint and having an attached file may be grouped. Based upon the disclosure provided herein, one of ordinary skill in the art will recognize a variety of basis upon which workloads may be considered similar to other workloads, and grouped together as similar workloads.

The similar workloads are grouped together into application tiers based upon which application with which they are associated (block 614). In some embodiments, such identification of applications and corresponding workloads may be done in accordance with that disclosed in U.S. Pat. No. 10,944,723 entitled "Systems and Methods for Managing Endpoints and Security Policies in a Networked Environment" that was previously incorporated by reference. In particular, FIGS. 9-11 and the corresponding discussion in the aforementioned incorporated reference describe one approach for transforming network communication metadata collected as part of a network traffic monitoring process, and using the transformed metadata for network identification (e.g., classification) processes. As just one example, the workloads for an application may be identified in three tiers (i.e., a web tier, an application tier, and a database tier) similar to that shown for Application A of ACL 410 of FIG. 4B.

A global list of all identified applications and workloads corresponding to the respective applications is assembled (block 616). All workloads in the global list are identified as not secured. Identifying a workload as not secure may be done, for example, by setting a secure flag associated with the particular workload as false. Based upon the disclosure provided herein, one of ordinary skill in the art will recognize a variety of approaches that may be used for identifying a workload as not secure.

A ZTNA policy is then determined for the workloads in the global list (block 618). In some cases, forming the ZTNA policy may be done by a network administrator manually defining an ACL indicating that one or more of the identified workloads are allowable. Such an ACL may be similar to, for example, ACL 300 of FIG. 3 that secures a database that accessed by a single application. While ACL 300 is shown as including one database accessed by a single application (Application A), it is noted that the ACL created by the network administrator may include several network assets and/or network applications.

In other cases, forming the ZTNA policy may be done by automatically using a process similar to that shown in flow diagram 618 of FIG. 6B (i.e., the same number as the block in FIG. 6A as flow diagram 618 represents a replacement for the block in FIG. 6A). Turning to FIG. 6B and following flow diagram 618, it is determined whether any applications remain in the global list that have not yet been processed for incorporation into an ACL (block 654). Where one or more applications remain for processing (block 654), the first/next application in the global list is selected (block 565), and the ACL is updated to include all workloads identified as corresponding to the selected application (block 658). Where it is the first application being added to the ACL, the ACL that is formed is similar to that discussed above in relation to FIG. 4B. Where it is a second or later application being added to the ACL, the ACL that is formed is similar to that discussed above in relation to FIG. 4D.

Forward testing is applied using the updated ZTNA policy including the updated ACL (block 660). This block is shown in dashed lines as detail of this block is set forth in relation to FIG. 5 above. During forward testing, any network traffic that is allowed because of the default rule (i.e., any network traffic not allowed by a rule specific to a workload of a particular application) is flagged.

The flagged network traffic is reported to, for example, a network administrator as forward testing results (block 662). As only the most recently selected application (i.e., Application A in the case of incremental ACL 410, or Application B in the case of incremental ACL 430) has not yet been fully secured, any network traffic allowed because of the default rule is likely either part of a workload not originally identified as part of the newly selected application or is some type of non-allowed network traffic. Accordingly, the report provided to the network administrator includes a relatively small amount of information compared with that which would have possibly generated if an entire ACL for a network was being forward tested at once. Further, as only one application operating in the network has not previously been fully secured (i.e., the most recently selected application), a network administrator does not have to consider every application to identify what application the network traffic corresponds. Rather, the network administrator need only consider the most recently selected application and the possibility of a non-allowed source or destination. This greatly simplifies the processes to be performed by a network administrator tasked with developing a ZTNA policy for a network.

It is determined whether a network administrator reviewing the reported results of forward testing has indicated a desired change to the rules in the ZTNA policy including the ACL (block 664). Where a change is indicated (block 664), the ZTNA policy including the ACL is modified to reflect the received change request (block 666) and the processes of blocks 658-664 are repeated for the updated ZTNA policy. The changes should be limited to the rules corresponding to the most recently selected application. Based upon the disclosure provided herein, one of ordinary skill in the art will recognize a variety of approaches that may be used in relation to different embodiments for a network administrator to indicate a change. As one example, a network administrator may simply edit the ACL to make a desired change.

Alternatively where no changes are indicated (block 664), the most recently selected application is considered a compliant ZTNA policy. In such a situation, each of the workloads associated with the most recently selected application are identified as secure (block 670). Identifying a workload as secure may be done, for example, by setting a secure flag associated with the particular workload as true. Based upon the disclosure provided herein, one of ordinary skill in the art will recognize a variety of approaches that may be used for identifying a workload as secure.

Further, the secured group is augmented to include all of the workloads that were newly identified as secured (block 672). For the first selected application, such augmenting of the secured group includes adding the workloads for the most recently selected application to an otherwise empty group. In contrast, for the second and later applications that are being processed, augmenting the secured group will include adding the workloads newly identified as secured to those previously included in the secured group.

Additionally the ACL is updated to include all secure workloads (block 674). This includes setting forth rules specifically allowing traffic of each workload corresponding to the selected application, and rules general to the secured group. The rules general to the secured group are two: (1) blocking traffic from any source to any destination included in the secured group using any protocol or port, and (2) blocking traffic from any source included in the secured group to any destination using any protocol or port. FIG. 4C discussed above shows an example of an ACL including a single application (i.e., Application A) that includes three identified workload tiers (traffic to a web A, traffic from web A to Application A, and traffic from Application A to Database A) is shown with the application secured; and FIG. 4E discussed above shows an example of an ACL including two applications (i.e., Application A and Application B) each with three identified workload tiers is shown with both of the applications secured.

After updating the ZTNA policy including the ACL to reflect all rules related to the most recently selected application (blocks 670-674), it is determined whether another application remains in the global list that have not yet been processed for incorporation into the ACL (block 654).

Where one or more applications remain for processing (block 654), the processes of blocks 656-674 are repeated for the next selected application. Once no additional applications remain for processing in the global list (block 654), forward ZTNA policy for the currently received network traffic is complete (block 654), and the process is returned to block 620 of FIG. 6A.

Returning to FIG. 6A and following flow diagram 600, it is determined if processing the most recent block of network traffic (i.e., network traffic recently assembled in block 608) resulted in any change to the ZTNA policy (block 620). Where any changes resulted in the ZTNA policy (block 620), the processes of blocks 606-620 are repeated for another block of network traffic where only workloads that were not previously considered are processed for inclusion in the ZTNA policy including the ACL.

Alternatively, where no changes were made to the ZTNA policy (block 620), the assets and/or applications included in the focus list are considered protected. It is then determined whether there are any asset(s) and/or applications touched by the previously considered workloads that have not yet been considered (block 622). Thus, for example, where the focus list original included only a particular database, all workloads directly touching the database are secured, but one or more applications or other assets that are the source of destination of the previously considered workloads may not yet have been considered. Using FIG. 1A as an example, database C 108 may be the destination of a workload corresponding of a data transfer from application C 112 to database C 108. This workload would have been considered and included in the ZTNA policy, but other workloads associated with application C 112 that do not directly touch database C 108 would not yet have been considered.

Where one or more assets and/or applications with direct contact to those in the focus list have not themselves been the subject of scrutiny applied to those in the focus list (block 622), these assets/applications are identified (block 628) and the focus list is augmented to include the additionally identified high value assets and/or applications (block 606). With the focus list thus augmented, the processes of blocks 608-628 are repeated where additional workloads corresponding to the newly added high value assets and/or applications are considered and included in a growing ZTNA policy.

Once no additional high value assets and/or applications are identified (block 622), the ZTNA policy is considered complete for the original focus. As such, the default rule of the ACL included in the ZTNA policy is modified from allow to block to enforce ZTNA policy including the ACL (block 624) and the ZTNA policy including the ACL is deployed (block 626). Such deployment may be as simple as beginning operation of the network where a network security appliance uses the ACL to control what network traffic is allowed to pass to and from a secured network. FIG. 4F shows an example of an ACL after modification of the default rule.

It is possible that using such a focus will ultimately result in covering all assets and applications in a network environment. In some cases, however, one or more assets and/or applications in the network environment will be sufficiently isolated that performing the processes of flow diagram 600 will not result in covering all assets and/or applications. In some embodiments, the process may be purposely limited to a defined number of degrees of separation from the originally identified high value asset(s) and/or application(s) (i.e., those received in block 602). Such would be done by limiting the number of times block 622 would be allowed to identify additional non-considered assets and/or applications. In one particular embodiment, block 622 is only allowed to find additional assets and/or applications two times resulting in coverage of workloads within two degrees of separation from the originally identified high value asset(s) and/or application(s) (i.e., those received in block 602). Based upon the disclosure provided herein, one of ordinary skill in the art will recognize a variety of degrees of separation that would be appropriate in a given scenario in accordance with different embodiments.

Figure 7:
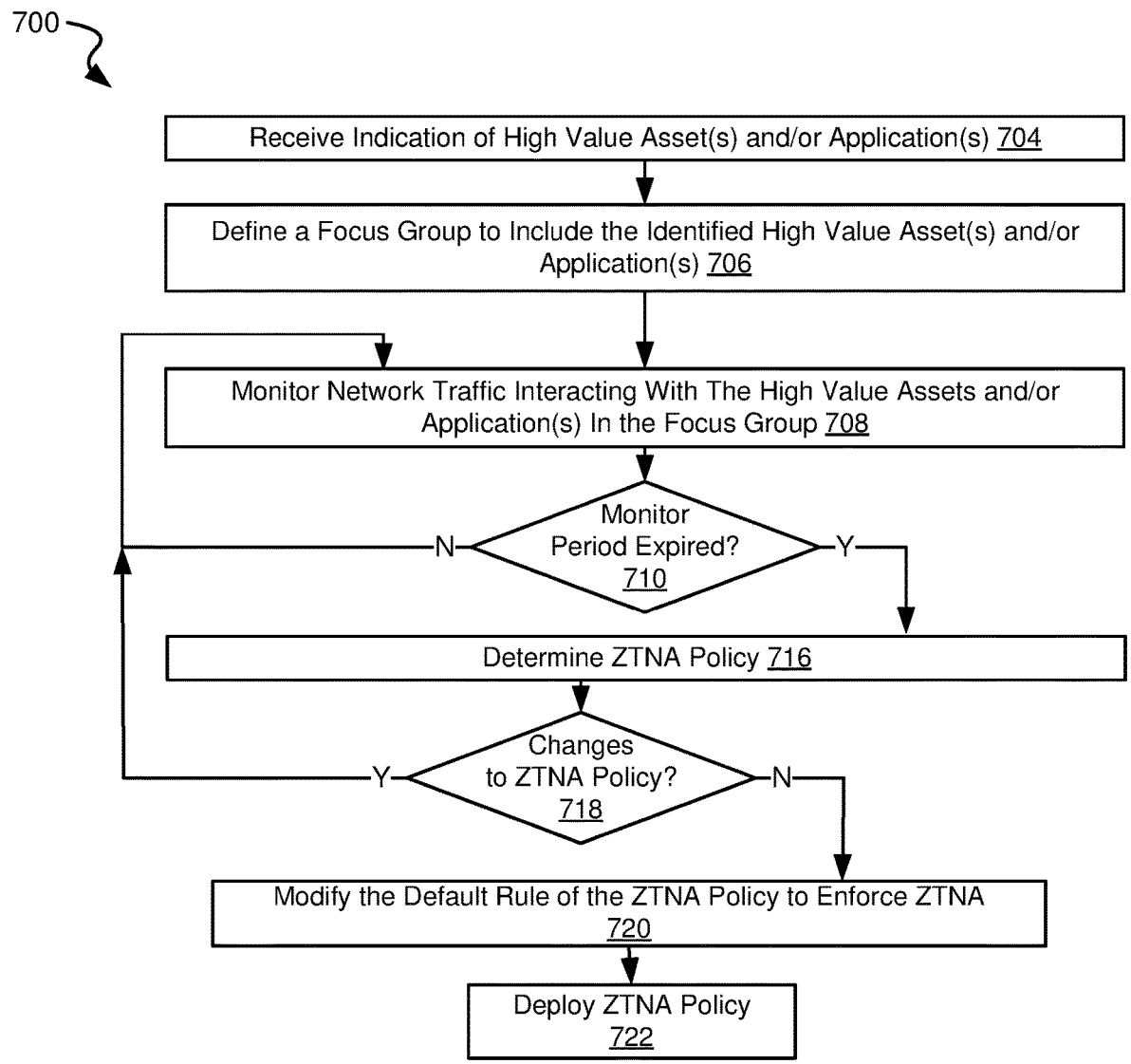
FIG. 7 is a flow diagram showing a method in accordance with one or more embodiments for developing a zero trust network access for specifically identified network elements.

Turning to FIG. 7, a flow diagram 700 shows a method in accordance with one or more embodiments for developing a zero trust network access for specifically identified network elements. Following flow diagram 700, an indication of a high value asset(s) and/or application(s) is received (block 704). The high value asset(s) and/or applications may be identified, for example, by a network administrator reviewing a physical asset map of a network and selecting one or more of the assets and/or applications operating in the network as a focus for a machine learning module responsible for identifying workloads and determining applications to which the workloads belong. As an example, the network administrator may identify a particular network database as a high value asset. The identified high value asset(s) and/or application(s) are then provided as an input. Based upon the disclosure provided herein, one of ordinary skill in the art will recognize a variety of high value asset(s) and/or application(s) that may be selected in accordance with different embodiments, and a number of mechanisms that may be used to identify the selected high value asset(s) and/or application(s) for processing.

A focus group is defined to include the newly identified high value asset(s) and/or application(s) (block 706). This focus group becomes the focus of the identification of workloads and applications to be secured.

Network traffic is monitored that is either transmitted to or received from one of the high value asset(s) and/or application(s) included in the focus group (block 708). Such traffic monitoring allows for identification of a number of workloads directly touching the specifically identified network elements. By focusing the monitoring on those network elements specifically identified in the focus group, only a subset of the overall network traffic is considered for grouping into similar destinations, origins, and/or the like for analysis. In some embodiments, such network traffic monitoring may be done in accordance with that disclosed in U.S. Pat. No. 10,944,723 entitled "Systems and Methods for Managing Endpoints and Security Policies in a Networked Environment" that was previously incorporated by reference. In particular, FIGS. 6-8 and the corresponding discussion in the aforementioned incorporated reference describe one approach for monitoring network traffic that may be used in relation to some embodiments discussed herein.

Such monitoring relies, at least in part, on meta information such as, for example, source and destination of the network traffic, the ports used for the network communication, the protocol used for the communication, other characteristics regarding the application communication that are derived from deep-packet inspection of the traffic.

This process of monitoring (block 708) is continued for a defined period (block 710). The defined period may be fixed or user programmable. In some cases, the defined period is set to allow for a sufficient number of network transactions to occur such that multiple instances of workloads associated with applications may be identified, and thus facilitate the automated identification of assets and corresponding workloads within the network environment.

Turning to FIG. 8A, an example set 810 of workloads touching either an Application A or a database C are shown. Such workloads may be identified as part of the workload monitoring process (i.e., block 708 of FIG. 7) where the focus list identifies Application A and Database C. As shown, set 810 of workloads includes four workloads (i.e., a workload from Application A to the Web using TCP over port 80, a workload from the Web to the Database C using TCP over port 443, a workload from an Endpoint X to Database C using TCP over port 3020, and a workload from an Endpoint Y to Application A using TCP over port 80.

Returning to FIG. 7, once the monitor period has expired (block 710), a ZTNA policy is determined for the workloads that include one of the assets and/or applications in the focus group as either a source or a destination (block 716). In some cases, forming the ZTNA policy may be done by a network administrator manually defining an ACL indicating that one or more of the identified workloads are allowable. Turning to FIG. 8B, an example ACL 820 for the workloads included in set 810 is shown. As shown, ACL 820 includes five rules—one for each of the workloads in set 810 (Rules 1-4), and a default rule (Rule 5).

Returning to FIG. 7, it is determined if processing the most recent block of network traffic (i.e., network traffic recently assembled in block 708) resulted in any change to the ZTNA policy (block 718). Where any changes resulted in the ZTNA policy (block 718), the processes of blocks 708-718 are repeated for another block of network traffic where only workloads that were not previously considered are processed for inclusion in the ZTNA policy including the ACL.

Alternatively, where no changes were made to the ZTNA policy (block 718), the assets and/or applications included in the focus list are considered protected. As such, the default rule of the ACL included in the ZTNA policy is modified from allow to block to enforce ZTNA policy including the ACL (block 720) and the ZTNA policy including the ACL is deployed (block 722). Such deployment may be as simple as beginning operation of the network where a network security appliance uses the ACL to control what network traffic is allowed to pass to and from a secured network. FIG. 8C shows an example of an ACL 830 after modification of the default rule.

Figure 9:
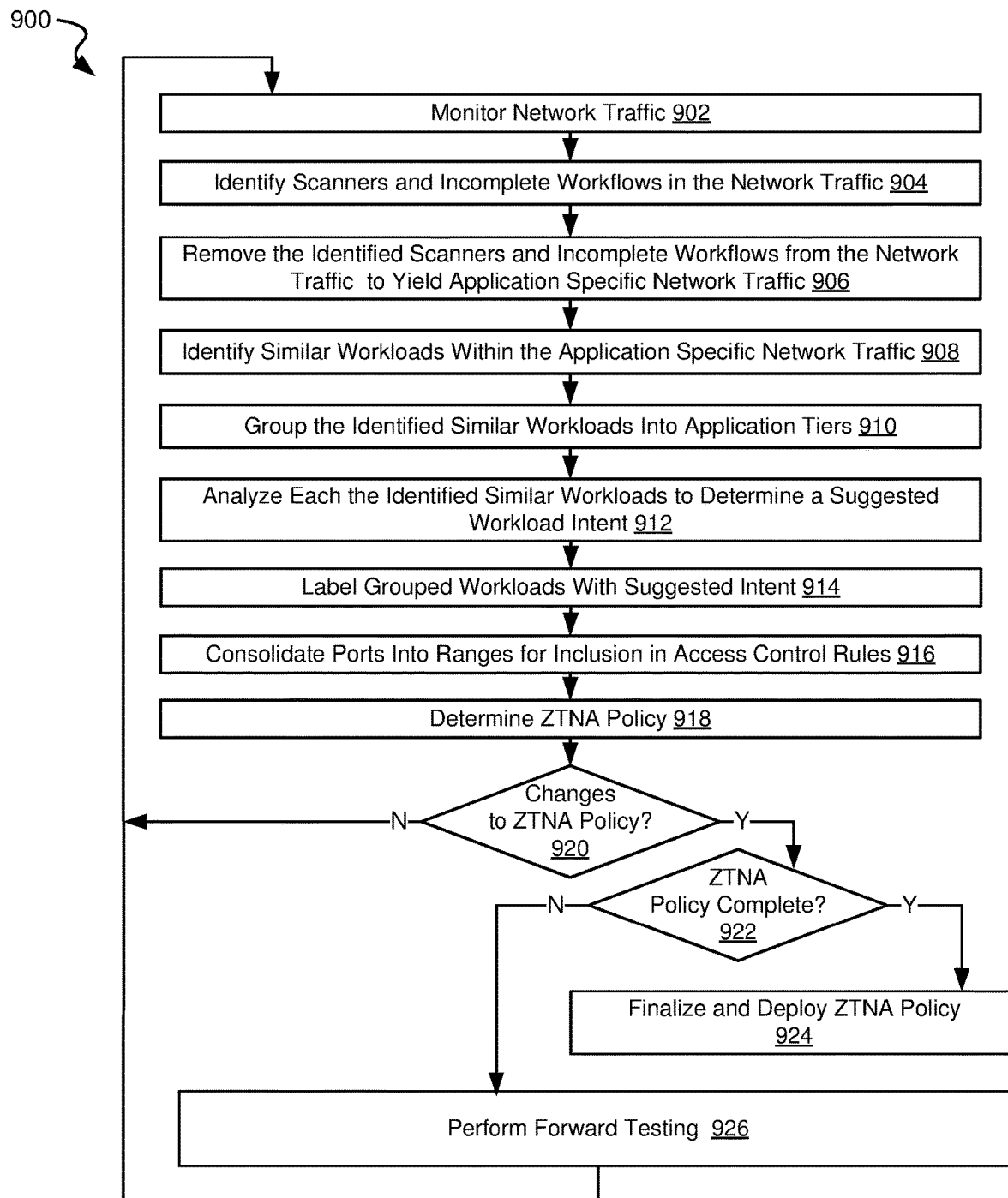
FIG. 9 is a flow diagram showing a method in accordance with various embodiments for developing a resilient zero trust network access policy based upon intent defined groups of workloads.

Turning to FIG. 9, a flow diagram 900 shows a method in accordance with various embodiments for developing a resilient zero trust network access policy based upon intent defined groups of workloads. Following flow diagram 900, network traffic is monitored that passes to and from a network appliance (block 902). Such traffic monitoring allows for identification of a number of workloads passing between various endpoints. This network traffic can be group into similar destinations, origins, and/or the like for analysis. In some embodiments, such network traffic monitoring may be done in accordance with that disclosed in U.S. Pat. No. 10,944,723 entitled "Systems and Methods for Managing Endpoints and Security Policies in a Networked Environment" that was previously incorporated by reference. In particular, FIGS. 6-8 and the corresponding discussion in the aforementioned incorporated reference describe one approach for monitoring network traffic that may be used in relation to some embodiments discussed herein. Such monitoring relies, at least in part, on meta information such as, for example, source and destination of the network traffic, the ports used for the network communication, the protocol used for the communication, other characteristics regarding the application communication that are derived from deep-packet inspection of the traffic.

Any scanners or incomplete workflows within the monitored network traffic are identified (block 904). Such scanners are applications that are run, for example, by an enterprise overseeing the network to scan the workloads for vulnerabilities, workload imbalances, and the like. In some cases, a scanner operates by trying to connect to every available port to determine if the port is open. When a port is open, the scanner will interact with the particular port to complete the communication. Alternatively, where a port is closed, only the scanner side of the communication is completed (i.e., no acknowledgement is sent back from the port) rendering it an incomplete workflow. Such incomplete workflows are also found in, for example, malicious network access attempts where a hacker is trying to identify open ports. In such attempts, a handshake request to a particular port is sent and where the port is open, an acknowledgement is sent back from the port. However, the request/acknowledgment pair is not followed by any further activity and such communication with an open port is considered an incomplete workflow. Based upon the disclosure provided herein, one of ordinary skill in the art will recognize a variety of scanners and/or workflows that may be identified in accordance with different embodiments.

In addition to the possibility of malicious network activity, the aforementioned scanners are continuously making legitimate connections throughout the network and scanning workloads, and as such any changes made to the ZTNA policy needs to allow for the scanners to continue performing their functions. As the workload traffic is monitored in block 902, the scanner traffic appears to be network traffic and is logged and if not removed from the network traffic appears to be traffic that would otherwise be combined as traffic for a particular application. In some embodiments, the scanners have identifiable signatures and/or are known and thus can be identified within the monitored network traffic. Based upon the disclosure provided herein, one of ordinary skill in the art will recognize a variety of processes for distinguishing scanner traffic from other network traffic. Such scanner traffic workloads and incomplete workloads make the network traffic more complicated to gather into identifiable applications as every element of the network appears to be communicating with every other element of the network making it appear to be a big mesh of network traffic rather than network traffic that can be gathered into separately distinguishable applications. To address this, the workloads associated with the identified scanners and incomplete workflows are removed from the monitored network traffic (i.e., the network traffic from block 902) leaving only application specific network traffic (block 906). It is noted that while this embodiment is described as gathering monitored network traffic and subsequently removing scanner workloads and any incomplete workflows from the network traffic, that in other embodiments such scanner workloads and/or incomplete workflows may be filtered out during the network traffic monitoring (i.e., the network traffic monitoring in block 902) thus leaving only the application specific network traffic.

Similar workloads in the application specific network traffic are grouped together into application tiers (block 908). The similarity of the workloads may be identified based upon any number of commonality in metadata about the workloads. For example, all workloads from a particular endpoint or to a particular endpoint may be grouped. As another example, all workloads from a particular endpoint on a particular port may be grouped. As yet another example, all workloads to a particular endpoint and having an attached file may be grouped. Based upon the disclosure provided herein, one of ordinary skill in the art will recognize a variety of basis upon which workloads may be considered similar to other workloads, and grouped together as similar workloads.

The identified similar workloads are grouped together into application tiers based upon which application with which they are associated (block 910). In some embodiments, such identification of applications and corresponding workloads may be done in accordance with that disclosed in U.S. Pat. No. 10,944,723 entitled "Systems and Methods for Managing Endpoints and Security Policies in a Networked Environment" that was previously incorporated by reference. In particular, FIGS. 9-11 and the corresponding discussion in the aforementioned incorporated reference describe one approach for transforming network communication metadata collected as part of a network traffic monitoring process, and using the transformed metadata for network identification (e.g., classification) processes. As just one example, the workloads for an application may be identified in three tiers (i.e., a web tier, an application tier, and a database tier) similar to that shown for Application A of ACL 410 of FIG. 4B.

Having grouped the similar workloads together (block 910), each of the groups of workloads is analyzed to determine a suggested intent of the workload (block 912). Such intent may be discerned, for example, based upon a destination of the workload. As a particular, example, where the workload is destined for a ticketing application the suggested workload intent may be "ticking request". As another example, where the workload is destined for a credit card processing service the suggested workload intent may be "CC payment". Based upon the disclosure provided herein, one of ordinary skill in the art will recognize a variety of suggested intents that may be determined based upon metadata corresponding to a group of workloads. Further, in some embodiments, the process is overseen by a network administrator who may choose to override an automatically determined suggested intent and input their own intent for the group. The suggested intents are reduced to labels that are associated with the respective groups of workloads (block 914). Such labeling of the groups of workloads results in an abstraction of the workloads, and all workloads under that label can be treated with the same intent based workload rule. As an example of such an intent based workload rules, it may be that all "CC payment" workloads are allowed. In such an example, the "CC payment" workloads would have been previously defined and grouped to include all workloads from a discrete set of endpoints and/or applications within the network.

Additionally, ports are consolidated into ranges of ports where multiple ports are used for a particular application (block 916). Such consolidation into ranges allows for access control rules that cover multiple ports in place of multiple access control rules each directed at individual ports. As an example, certain services such as the domain name service (DNS) runs on port 53. In such cases it is a single port and the rule in the access control list is easily defined. However, other examples use multiple dynamically assigned ports. In such cases, all of the ports are included in the access control rule for the particular service and/or application.

Figure 10A:
FIGS. 10A-10B graphically depict access control lists having multi-port access control rules in accordance with some embodiments.

As a particular example, the file transfer protocol (FTP) negotiate for ports to use and as a result of the negotiation a range of ports are opened. FTP then picks any port within the range of opened ports to perform its function for a first communication, and then FTP may pick another port within the range of open ports to perform its function for a subsequent communication. In such a case, it is the entire range of open ports that are treated by a single access control rule rather than requiring a separate access control rule for all open ports in the range. In some embodiments, the workloads in the application specific network traffic are considered to determine if they are associated with a service, application, and/or endpoint that uses dynamic port ranges. Where such is found, all of the workloads are represented by a single access control rule covering the entire range of ports. Turning to FIG. 10A, an access control list 1010 shows an example, access control rule (Rule 2) allowing for network traffic from FTP to an Application A over any port between 5000 and 5199.

Figure 10B:

As another particular example, an application may negotiate for a data channel port and a control channel port. In such examples, the workload associated with the control channel port is investigated to determine which ports have been negotiated and assigned, and both the data channel port and the control channel port are included in a single access control rule. Turning to FIG. 10B, an access control list 1020 shows an example, access control rule (Rule 2) allowing for network traffic from an Application B to an Application A over a control channel (i.e., port 2000) and a data channel (i.e., port 2010). Based upon the disclosure provided herein, one of ordinary skill in the art will recognize a variety of multi-port scenarios and mechanisms for identifying such that can be consolidated into a number of access control rules that is less than the number of access control rules that would be needed if every port was treated individually.

Returning to FIG. 9, a ZTNA policy is determined for the workloads that include any consolidated port ranges (i.e., from block 916) and treat the labeled groups of workloads (i.e., from block 914). In some cases, forming the ZTNA policy may be done by a network administrator manually defining an ACL indicating that one or more of the identified workloads are allowable. Alternatively, forming the ZTNA policy may be done using any of the automated approaches discussed herein.

It is determined if processing the most recent block of network traffic (i.e., network traffic recently assembled in block 902) resulted in any change to the ZTNA policy (block 920). Where any changes resulted in the ZTNA policy (block 920), the processes of blocks 902-920 are repeated for another block of network traffic where only workloads that were not previously considered are processed for inclusion in the ZTNA policy including the ACL.

Alternatively, where no changes were made to the ZTNA policy (block 920), it is determined whether the ZTNA policy is complete (block 922). This may be determined, for example, by a network administrator. In some cases, the ZTNA policy will require some level of forward testing or modifications. Where such is the case, forward testing is performed on the ZTNA policy (block 926). The forward testing may be performed on the entire ACL of the ZTNA policy at once or may be done incrementally as discussed herein in relation to FIG. 2. Alternatively, whether the ZTNA policy is complete (block 922), the ZTNA policy is finalized and deployed (block 924). Finalizing may include, for example, changing the default rule of the ACL included in the ZTNA policy form allow to block as discussed in relation to other embodiments herein, and deploying the ZTNA policy may include beginning operation of the network where a network security appliance uses the ACL to control what network traffic is allowed to pass to and from a secured network.

In conclusion, the present invention provides for novel systems, devices, and methods. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A method for performing forward testing on an access control list in a network environment, the method comprising:
    accessing, by a processing resource, a first access control list including at least a first workload rule that allows a first type of network communication and a default rule, wherein the first type of network communication corresponds to a first application;
    modifying, by the processing resource, the first access control list to yield a second access control list, wherein the second access control list additionally includes at least a secure rule and a second workload rule other than the first workload rule, wherein the secure rule blocks at least the first type of network communication, wherein the second workload rule allows a second type of network communication, and wherein the second type of network communication, different from the first type of network communication, corresponds to the second application; and
    forward testing, by the processing resource, the second access control list, wherein the forward testing includes applying a set of network control rules included in the second access control list in a sequence until one of the rules in the set of network control rules is satisfied, and wherein the sequence as applied to the network control rules is based on an order list that includes:
    applying first the first workload rule before the secure rule;
    applying the secure rule before applying the second workload rule;
    applying the second workload rule before applying the default rule; and then
    applying the default rule.

2. The method of claim 1, wherein the default rule allows any network communication between any source and any destination, and wherein the method further comprises:
    logging, by the processing resource, any network communications allowed by applying the default rule to yield logged network communications; and
    reporting, by the processing resource, the logged network communications.

3. The method of claim 2, wherein the set of network control rules is a first set of network control rules, wherein the sequence is a first sequence, and wherein the method further comprises:
    forward testing, by the processing resource, a third access control list, wherein the third access control list is the second access control list modified to include a third workload rule implemented to address an issue reflected in the logged network communications, and wherein the forward testing the third access control list includes applying a second set of network control rules included in the third access control list in a second sequence until one of the rules in the second set of network control rules is satisfied, and wherein the second sequence includes:
    applying the first workload rule before the secure rule;
    applying the secure rule before applying the second workload rule or the third workload rule;
    applying the second workload rule and the third default rule before applying the default rule; and
    applying the default rule.

4. The method of claim 2, wherein the logged network communications are not related to the first application.

5. The method of claim 1, wherein the set of network control rules is a first set of network control rules, wherein the sequence is a first sequence, and wherein the method further comprises:
    modifying, by the processing resource, the secure rule to yield a modified secure rule, wherein the modified secure rule blocks at least the second type of network communication in addition to the first type of network communication;
    modifying, by the processing resource, the second access control list to yield a third access control list, wherein the third access control list includes the modified secure rule and a third workload rule, wherein the third workload rule allows a third type of network communication, and wherein the third type of network communication corresponds to a third application; and
    forward testing, by the processing resource, the third access control list, wherein the forward testing includes applying a second set network control rules included in the third access control list in a second sequence until one of the rules in the second set of network control rules is satisfied, and wherein the second sequence includes:
    applying the first workload rule and the second workload rule before the secure rule;
    applying the secure rule before applying the third workload rule;
    applying the third workload rule before applying the default rule; and
    applying the default rule.

6. The method of claim 5, wherein the default rule allows any network communication between any source and any destination, and wherein the method further comprises:
    logging, by the processing resource, any network communications allowed by applying the default rule to yield logged network communications;
    reporting, by the processing resource, the logged network communications; and
    wherein the logged network communications are not related to either the first application or the second application.

7. The method of claim 1, the method further comprising:
    modifying, by the processing resource, the default rule to block any network communication between any source and any destination.

8. The method of claim 1, wherein the processing resource is included in a network appliance.

9. The method of claim 1, wherein the network appliance is a network firewall.

10. A network appliance, the network appliance comprising:
a hardware processing resource;
a non-transitory computer-readable storage medium, coupled to the hardware processing resource, having stored therein instructions that when executed by the hardware processing resource cause the hardware processing resource to:
access a first access control list including at least a first workload rule that allows a first type of network communication and a default rule, wherein the first type of network communication corresponds to a first application;
modify the first access control list to yield a second access control list, wherein the second access control list additionally includes at least a secure rule other than the first workload rule and a second workload rule, wherein the secure rule blocks at least the first type of network communication, wherein the second workload rule allows a second type of network communication, and wherein the second type of network communication, different from the first type of network communication, corresponds to the second application; and
forward test the second access control list, wherein the forward testing includes applying a set of network control rules included in the second access control list in a sequence until one of the rules in the set of network control rules is satisfied, and wherein the sequence as applied to the network control rules is based on an order list that includes:
applying first the first workload rule before the secure rule;
applying the secure rule before applying the second workload rule;
applying the second workload rule before applying the default rule; and then
applying the default rule.

11. The network appliance of claim 10, the network appliance is a network firewall.

12. The network appliance of claim 10, wherein the default rule allows any network communication between any source and any destination, and wherein the instructions that when executed by the hardware processing resource further cause the hardware processing resource to:
log any network communications allowed by applying the default rule to yield logged network communications;
report the logged network communications; and
wherein the logged network communications are not related to the first application.

13. The network appliance of claim 10, wherein the set of network control rules is a first set of network control rules, wherein the sequence is a first sequence, and wherein the instructions that when executed by the hardware processing resource further cause the hardware processing resource to:
forward test a third access control list, wherein the third access control list is the second access control list modified to include a third workload rule implemented to address an issue reflected in the logged network communications, and wherein the forward testing the third access control list includes applying a second set of network control rules included in the third access control list in a second sequence until one of the rules in the second set of network control rules is satisfied, and wherein the second sequence includes:
applying the first workload rule before the secure rule;
applying the secure rule before applying the second workload rule or the third workload rule;
applying the second workload rule and the third default rule before applying the default rule; and
applying the default rule.

14. The network appliance of claim 10, wherein the set of network control rules is a first set of network control rules, wherein the sequence is a first sequence, and wherein the instructions that when executed by the hardware processing resource further cause the hardware processing resource to:
modify the secure rule to yield a modified secure rule, wherein the modified secure rule blocks at least the second type of network communication in addition to the first type of network communication;
modify the second access control list to yield a third access control list, wherein the third access control list includes the modified secure rule and a third workload rule, wherein the third workload rule allows a third type of network communication, and wherein the third type of network communication corresponds to a third application; and
forward testing the third access control list, wherein the forward testing includes applying a second set network control rules included in the third access control list in a second sequence until one of the rules in the second set of network control rules is satisfied, and wherein the second sequence includes:
applying the first workload rule and the second workload rule before the secure rule;
applying the secure rule before applying the third workload rule;
applying the third workload rule before applying the default rule; and
applying the default rule.

15. The network appliance of claim 10, wherein the instructions that when executed by the hardware processing resource further cause the hardware processing resource to:
modify the default rule to block any network communication between any source and any destination.

16. A non-transitory computer-readable storage medium embodying a set of instructions, which when executed by a hardware processing resource, causes the hardware processing resource to:
access a first access control list including at least a first workload rule that allows a first type of network communication and a default rule, wherein the first type of network communication corresponds to a first application;
modify the first access control list to yield a second access control list, wherein the second access control list additionally includes at least a secure rule and a second workload rule other than the first workload rule, wherein the secure rule blocks at least the first type of network communication, wherein the second workload rule allows a second type of network communication, and wherein the second type of network communication, different from the first type of network communication, corresponds to the second application; and
forward testing the second access control list, wherein the forward testing includes applying a set of network control rules included in the second access control list in a sequence until one of the rules in the set of network control rules is satisfied, and wherein the sequence as applied to the network control rules is based on an order list that includes:
applying first the first workload rule before the secure rule;
applying the secure rule before applying the second workload rule;
applying the second workload rule before applying the default rule; and then
applying the default rule.

17. The non-transitory computer-readable storage medium of claim 16, wherein the default rule allows any network communication between any source and any destination, and wherein the set of instructions, which when executed by the hardware processing resource, further causes the hardware processing resource to:
log any network communications allowed by applying the default rule to yield logged network communications;
report the logged network communications; and
wherein the logged network communications are not related to the first application.

18. The non-transitory computer-readable storage medium of claim 17, wherein the set of network control rules is a first set of network control rules, wherein the sequence is a first sequence, and wherein the set of instructions, which when executed by the hardware processing resource, further causes the hardware processing resource to:
forward test a third access control list, wherein the third access control list is the second access control list modified to include a third workload rule implemented to address an issue reflected in the logged network communications, and wherein the forward testing the third access control list includes applying a second set of network control rules included in the third access control list in a second sequence until one of the rules in the second set of network control rules is satisfied, and wherein the second sequence includes:
applying the first workload rule before the secure rule;
applying the secure rule before applying the second workload rule or the third workload rule;
applying the second workload rule and the third default rule before applying the default rule; and
applying the default rule.

19. The non-transitory computer-readable storage medium of claim 16, wherein the set of network control rules is a first set of network control rules, wherein the sequence is a first sequence, and wherein the set of instructions, which when executed by the hardware processing resource, further causes the hardware processing resource to:
modify the secure rule to yield a modified secure rule, wherein the modified secure rule blocks at least the second type of network communication in addition to the first type of network communication;
modify the second access control list to yield a third access control list, wherein the third access control list includes the modified secure rule and a third workload rule, wherein the third workload rule allows a third type of network communication, and wherein the third type of network communication corresponds to a third application; and
forward test the third access control list, wherein the forward testing includes applying a second set network control rules included in the third access control list in a second sequence until one of the rules in the second set of network control rules is satisfied, and wherein the second sequence includes:
applying the first workload rule and the second workload rule before the secure rule;
applying the secure rule before applying the third workload rule;
applying the third workload rule before applying the default rule; and
applying the default rule.

20. The non-transitory computer-readable storage medium of claim 16, wherein the set of instructions, which when executed by the hardware processing resource, further causes the hardware processing resource to:
modify the default rule to block any network communication between any source and any destination.

* * * * *